(12) United States Patent
Kokubo et al.

(10) Patent No.: US 6,402,799 B1
(45) Date of Patent: Jun. 11, 2002

(54) VORTEX-STREAM GAS-LIQUID SEPARATOR AND GAS-LIQUID SEPARATION SYSTEM

(75) Inventors: Fumio Kokubo; Ryo Inoshiri, both of Nara; Akira Takushima, Yamatotakada, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/582,259
(22) PCT Filed: Dec. 24, 1998
(86) PCT No.: PCT/JP98/05924
 § 371 (c)(1),
 (2), (4) Date: Jun. 23, 2000
(87) PCT Pub. No.: WO99/33570
 PCT Pub. Date: Jul. 8, 1999

(30) Foreign Application Priority Data

Dec. 25, 1997 (JP) .............................................. 9-356699
Sep. 4, 1998 (JP) ........................................... 10-250601

(51) Int. Cl.⁷ .............................................. B01D 45/16
(52) U.S. Cl. ........................ 55/396; 55/432; 55/459.1; 55/466; 96/188

(58) Field of Search .............................. 55/459.1, 459.2, 55/459.3, 459.4, 459.5, 466, 347, 432, 394, 396; 96/188

(56) References Cited

U.S. PATENT DOCUMENTS 4,975,192 A * 12/1990 Uda et al. ................. 210/512.1

* cited by examiner

Primary Examiner—Robert A. Hopkins

(57) ABSTRACT

A compact vortex-stream gas-liquid separator, and a gas-liquid separation system employing it, offers high gas-liquid separation performance with minimal pressure loss. A substantially cylindrical casing (10) is arranged with its axis lying horizontally. The casing has a fluid passage (1) formed therein, has a fluid inlet (2) provided at one end, and has a gas outlet (3) and a liquid outlet (4) provided at the other end so as to constitute as a whole a vortex-stream gas-liquid separator (9). The fluid inlet is arranged along a line tangential to the casing so that the gas-liquid two-phase fluid passes through the fluid passage in the form of a vortex stream. The gas outlet is arranged so as to be coaxial with the casing. This vortex-stream gas-liquid separator and the gas-liquid separation system (30) employing it are used in a clothes dryer or air conditioner to remove water droplets from air.

16 Claims, 31 Drawing Sheets

9A

9B

9C

9C

9D

9E

9J

9K

9L

VORTEX-STREAM GAS-LIQUID SEPARATOR AND GAS-LIQUID SEPARATION SYSTEM

This application is the national phase under 35 U.S.C. §371 of PCT International Application No. PCT/JP98/05924 which has an International filing date of Dec. 24, 1998, which designated the United States of America.

TECHNICAL FIELD

The present invention relates to a gas-liquid separator for separating gas and liquid in gas-liquid two-phase fluid, i.e. gas containing liquid suspended therein, generated in an air conditioner, clothes dryer, internal-combustion engine, or the like, and more particularly to a vortex-stream gas-liquid separator for separating air and water in the fluid circulated in a clothes dryer by passing a circularly whirling vortex stream through the fluid passage inside the drying chamber of the clothes dryer.

BACKGROUND ART

Vortex-stream gas-liquid separators are used in various fields as a simple mechanism for separating gas and liquid in gas-liquid two-phase fluid. For example, Japanese Laid-Open Patent Application No. H5-38408 discloses a vortex-stream gas-liquid separator for removing moisture from the steam used in a geothermal power plant, and Japanese Laid-Open Patent Application No. H5-86831 discloses a vortex-stream gas-liquid separator for separating mist of lubricating oil from the blow-by gas generated in an internal-combustion engine.

FIGS. 1A and 1B show the vortex-stream gas-liquid separator disclosed in Japanese Laid-Open Patent Application No. H5-38408 mentioned above. FIG. 1A shows a vertical sectional view of the vortex-stream gas-liquid separator 9, and FIG. 1B shows a horizontal sectional view thereof taken along the line A—A shown in FIG. 1A. This vortex-stream gas-liquid separator 9 is composed of a casing 10 having a fluid passage 1 having a cylindrical cross section, a fluid inlet 2 for introducing gas-liquid two-phase fluid, a gas outlet 3, and a liquid outlet 5.

The casing 10 is arranged vertically with the axis of the fluid passage 1 lying vertically. The fluid inlet 2 is provided substantially at the center, in the vertical direction, of the casing 10 in such a way as to introduce the gas-liquid two-phase fluid in the direction of a line tangential to the circular cross section of the fluid passage 1. The gas outlet 3 is provided so as to be coaxial with the fluid passage 1 by being inserted into the casing 10 from below in such a way that an opening of the gas outlet 3 is located in an upper portion of the inside of the casing 10. The liquid outlet 5 is provided in a lower portion of the casing 10.

The gas-liquid two-phase fluid introduced through the fluid inlet 2 into the casing 10 collides with the inner wall of the casing 10 as it passes through the fluid passage 1 in the form of a vortex stream. As a result of this collision, the droplets of the liquid contained in the gas-liquid two-phase fluid are condensed on the wall surface, then flow downward along the wall surface, and are eventually discharged through the liquid outlet 5. On the other hand, the gas that remains after the removal of the droplets of the liquid is discharged through the opening 3a of the gas outlet 3.

FIGS. 2A, 2B, and 2C show the vortex-stream gas-liquid separator disclosed in Japanese Laid-Open Patent Application No. H5-86831 mentioned above. FIG. 2A is a front view of the vortex-stream gas-liquid separator 9, FIG. 2B is a side view thereof as seen from the direction B shown in FIG. 2A, and FIG. 2C is a horizontal sectional view thereof taken along the line A—A shown in FIG. 2A. This vortex-stream gas-liquid separator 9 is composed of a casing 10 having a cylindrical cross section and having a fluid passage 1, a fluid inlet 2 for introducing gas-liquid two-phase fluid, a gas outlet 3, and a liquid collection reservoir 7 provided below the fluid passage 1.

The casing 10 is arranged horizontally with the axis of the fluid passage 1 lying horizontally. The fluid inlet 2 is provided at one end of the casing 10 in such a way as to introduce the gas-liquid two-phase fluid in the direction of a line tangential to the circular cross section of the fluid passage 1. The gas outlet 3 is provided so as to be coaxial with the fluid passage 1 by being inserted into the casing 10 from that end 1a of the casing 10 at which the fluid inlet 2 is provided in such a way that an opening 3a of the gas outlet 3 is located near the other end 1c of the casing 10 opposite to the fluid inlet 2. Between the fluid passage 1 and the liquid collection reservoir 7 is provided a partition wall having slits 11 formed therein. The liquid collection reservoir 7 is provided with an outlet 8 for discharging the collected liquid.

The gas-liquid two-phase fluid introduced through the fluid inlet 2 into the fluid passage 1 forms a vortex stream that whirls circularly (in the direction indicated by an arrow J) along the inner wall of the casing 10 as it passes through the fluid passage 1 in the direction indicated by an arrow K. Meanwhile, the droplets of the liquid contained in the gas-liquid two-phase fluid collide with and are condensed on the inner wall of the casing 10, then flow downward along the wall surface, and then drip through the slits 11 into the liquid collection reservoir 7. The liquid collected in the liquid collection reservoir 7 is discharged through the liquid outlet 8. While the droplets of the liquid are being removed in this way, the gas-liquid two-phase fluid advances horizontally until it reaches the opening 3a of the gas outlet 3, through which the gas that remains after the removal of the droplets of the liquid is discharged.

In the vertical-type vortex-stream gas-liquid separator shown in FIGS. 1A and 1B, making the gas-liquid separator as a whole more compact requires making the fluid passage narrower. Thus, to treat the same amount of gas-liquid two-phase fluid, the fluid needs to be passed at an increased flow rate. However, as the flow rate increases, the droplets of the liquid that have condensed on the inner wall of the casing 10 increasingly tend to flow toward the opening 3a of the gas outlet 3 rather than flowing downward. This leads to lower gas-liquid separation performance. In other words, it is difficult to make this vertical-type vortex-stream gas-liquid separator more compact without sacrificing the gas-liquid separation performance.

On the other hand, in the horizontal-type vortex-stream gas-liquid separator shown in FIGS. 2A, 2B, and 2C, the gas-liquid two-phase fluid is allowed to flow freely through the slits 11 into the liquid collection reservoir 7, and thus comes to contain again the droplets of the liquid that have once been separated. Accordingly, the gas discharged through the gas outlet 3 contains a large number of droplets of the liquid. This leads to unsatisfactory gas-liquid separation performance. Moreover, since the fluid inlet 2 and the gas outlet 3 are provided at the same end of the casing 10, discharging the gas requires reversing the flow direction of the gas inside the fluid passage 1. This causes pressure loss.

DISCLOSURE OF THE INVENTION

An object of the present invention is to provide a compact vortex-stream gas-liquid separator that offers high gas-liquid separation performance with minimal pressure loss, and to provide a gas-liquid separation system employing such a gas-liquid separator.

To achieve the above object, according to one aspect of the present invention, a vortex-stream gas-liquid separator for separating gas and liquid contained in gas-liquid two-phase fluid is provided with a fluid passage having substantially the shape of a column and arranged with the center axis thereof lying substantially horizontally, a fluid inlet provided near a first end surface of the fluid passage so as to introduce the gas-liquid two-phase fluid into the fluid passage in such a way that the gas-liquid two-phase fluid passes through the fluid passage in the form of a vortex stream, a gas outlet provided at a second end surface of the fluid passage substantially coaxially with the fluid passage so as to discharge separated gas, and a liquid outlet provided in a lower portion of the fluid passage between the center and the second end surface of the fluid passage so as to discharge separated liquid.

The gas-liquid two-phase fluid introduced through the fluid inlet provided near the first end surface into the fluid passage collides with the wall surface that defines the circumferential surface of the substantially columnar fluid passage as it passes toward the second end surface in the form of a vortex stream. As a result of this collision, the liquid contained in the gas-liquid two-phase fluid clings to the wall surface as droplets, and is thereby separated from the gas. Under the influence of gravity and the flow of the gas-liquid two-phase fluid, the droplets of the liquid that have condensed on the wall surface reach the liquid outlet, and are discharged therethrough out of the fluid passage. The gas thus separated from the liquid reaches the second end surface, and is discharged through the gas outlet provided there out of the fluid passage.

The liquid outlet is provided between the center and the second end surface of the fluid passage, and therefore the gas-liquid two-phase fluid that has been introduced through the fluid inlet into the fluid passage is not influenced by the liquid outlet until it reaches the center of the fluid passage. Accordingly, the vortex stream of the gas-liquid two-phase fluid is maintained stably while it passes through a sufficiently long distance, and meanwhile sufficient separation of the gas and the liquid is achieved. This helps achieve high separation performance. Moreover, the fluid inlet and the gas outlet are provided at one end and at the other end, respectively, of the fluid passage, and therefore the flow direction of the gas-liquid two-phase fluid does not need to be reversed inside the fluid passage. This helps minimize pressure loss.

This vortex-stream gas-liquid separator has a very simple structure, and can thus be made more compact easily. Moreover, this vortex-stream gas-liquid separator has no member provided inside the fluid passage, and therefore, even if it is made more compact, the cross-sectional area of its fluid passage is not reduced to a larger extent than is inevitable to make the gas-liquid separator as whole more compact. Thus, it is possible to realize a vortex-stream gas-liquid separator that is compact but nevertheless offers high gas-liquid separation performance.

This vortex-stream gas-liquid separator may be further provided with a liquid collection reservoir arranged below the fluid passage and communicating with the fluid passage through the liquid outlet so as to collect the liquid discharged through the liquid outlet. This helps prevent the separated liquid from moistening the surroundings of the vortex-stream gas-liquid separator, and thereby alleviates the restrictions as to where to install and use the vortex-stream gas-liquid separator. Moreover, the gas is discharged only through the gas outlet, and therefore it is possible to introduce the gas-liquid two-phase fluid into the fluid passage not only by blowing it in through the fluid inlet but also by sucking it out through the gas outlet. This helps widen the application of the vortex-stream gas-liquid separator.

Furthermore, the liquid outlet is provided not over the entire length of the fluid passage but between the center and the second end surface of the fluid passage. This makes it difficult for the gas-liquid two-phase fluid to flow into the liquid collection reservoir, and thus makes it difficult for the liquid collected in the liquid collection reservoir to be contained again in the gas-liquid two-phase fluid. This helps maintain high gas-liquid separation performance.

To prevent the gas-liquid two-phase fluid having flown into the liquid collection reservoir from blowing up the liquid collected in the liquid collection reservoir, it is preferable that the liquid collection reservoir be so shaped and sized that, when a predetermined amount of the liquid is collected therein, the surface of the collected liquid is 10 mm or more away from the liquid outlet.

It is possible to provide additionally, in a lower portion of the liquid collection reservoir, a drain outlet and, inside the liquid collection reservoir, a float that floats on the liquid collected in the liquid collection reservoir and a valve that is coupled to the float so as to open/close the drain outlet by moving together with the float. This makes it possible to discharge automatically the liquid collected in the liquid collection reservoir when it reaches a predetermined level.

It is preferable that the float and the valve be so designed as to keep the surface of the collected liquid 10 mm or more away from the liquid outlet at all times. This helps prevent the gas-liquid two-phase fluid having flown into the liquid collection reservoir from blowing up the liquid collected in the liquid collection reservoir, and thereby maintain high gas-liquid separation performance at all times.

It is preferable that the fluid inlet introduce the gas-liquid two-phase fluid in such a way that the gas-liquid two-phase fluid flows into only one of the two portions of the fluid passage divided by a plane including the center axis of the fluid passage and substantially parallel to that plane. This makes it difficult for the gas-liquid two-phase fluid passing through the fluid passage in the form of a vortex stream to include a component that whirls in the direction opposite to the vortex stream. This helps stabilize the vortex stream of the gas-liquid two-phase fluid, and thereby achieve high separation performance.

To achieve higher gas-liquid separation performance, it is preferable that the liquid outlet reach the second end surface of the fluid passage.

It is possible to provide additionally a damming means near the liquid outlet so as to prevent the liquid that has condensed on the inner circumferential surface of the fluid passage from traveling toward the second end surface of the fluid passage.

It is possible to provide additionally a restricting means on the second end surface of the fluid passage so as to prevent the liquid from flowing along the second end surface to the gas outlet. For example, the restricting means is realized as a pipe that at one end communicates with the gas outlet and that at the other end protrudes inward from the second end surface of the fluid passage so as to have an opening inside the fluid passage. To achieve even higher gas-liquid separation performance, it is possible to provide additionally a partition plate that extends from the end of the pipe radially outward inside the fluid passage, with at least two thirds of the liquid outlet located between the partition plate and the second end surface of the fluid passage.

It is preferable that the liquid outlet measure 8 mm or more and 30 mm or less along the center axis of the fluid passage. Making the liquid outlet so small helps make it more difficult for the gas-liquid two-phase fluid to flow into the liquid collection reservoir, and thereby achieve higher gas-liquid separation performance.

Providing a plurality of liquid outlets within an area measuring 8 mm or more and 30 mm or less along the center axis of the fluid passage serves the same purpose.

It is possible to give resilience to the wall surface of the member that defines the circumferential surface of the fluid passage. This helps prevent the liquid contained in the gas-liquid two-phase fluid that has collided with the wall surface from being splashed and contained again in the gas-liquid two-phase fluid, and thereby achieve still higher separation performance.

To achieve the above object, according to another aspect of the present invention, a vortex-stream gas-liquid separator for separating gas and liquid contained in gas-liquid two-phase fluid is provided with a fluid passage having substantially the shape of a columnar and arranged with the center axis thereof lying substantially horizontally, a fluid inlet provided near a first end surface of the fluid passage so as to introduce the gas-liquid two-phase fluid into the fluid passage in such a way that the gas-liquid two-phase fluid passes through the fluid passage in the form of a vortex stream, a gas outlet provided at a second end surface of the fluid passage substantially coaxially with the fluid passage so as to discharge separated gas, a liquid outlet provided in a lower portion of the fluid passage about half a turn or more away from the fluid inlet in the direction of the vortex stream of the gas-liquid two-phase fluid and having a strip-like shape extending along the center axis of the fluid passage, and a liquid collection reservoir provided below the fluid passage and communicating with the fluid passage through the liquid outlet so as to collect the liquid discharged through the liquid outlet.

In this vortex-stream gas-liquid separator, the liquid collection reservoir that communicates with the fluid passage through the liquid outlet is provided below the fluid passage. The liquid outlet has a rectangular shape that is longer along the center axis of the fluid passage, and is thus shorter in width. This makes it difficult for the gas-liquid two-phase fluid passing through the fluid passage in the form of a vortex stream to flow into the liquid collection reservoir. Moreover, the liquid outlet is provided approximately about half a turn or more away from the fluid inlet in the direction of the vortex stream of the fluid, and therefore it little influences the gas-liquid two-phase fluid that has just entered the fluid passage. This helps maintain the vortex stream of the gas-liquid two-phase fluid stably, and thereby achieve high gas-liquid separation performance. Moreover, the fluid inlet and the gas outlet are provided at one end and at the other end, respectively, of the fluid passage, and therefore the flow direction of the gas-liquid two-phase fluid does not need to be reversed inside the fluid passage. This helps minimize pressure loss.

To achieve the above object, according to still another aspect of the present invention, a gas-liquid separation system is provided with a vortex-stream gas-liquid separator as described above, a compressor for compressing air, a heat exchanger for exchanging heat between air fed from the compressor and air fed from the gas outlet of the vortex-stream gas-liquid separator, and an expander for expanding the air fed from the compressor through the heat exchanger and then feeding the thus expanded air to the fluid inlet of the vortex-stream gas-liquid separator.

In this gas-liquid separation system, air in a first, high-humidity, state is converted into air in a second, high-temperature and high-humidity, state by the compressor, then the air in the second state is converted into air in a third, low-temperature and high-humidity, state by the heat exchanger, then the air in the third state is converted into air in a fourth, low-temperature, high-humidity, and water-droplets-containing, state by the expander, then the air in the fourth state is separated into water and air in a fifth, low-temperature, high-humidity, and water-droplets-free, state by the vortex-stream gas-liquid separator, and then the air in the fifth state is converted into air in a sixth, high-temperature and low-humidity, state by the heat exchanger.

Since the vortex-stream gas-liquid separator described above offers high separation performance with minimal pressure loss, this gas-liquid separation system employing it is highly efficient. Moreover, heat is exchanged between the air before gas-liquid separation and the air after gas-liquid separation so as to raise the temperature of the latter greatly. Thus, this gas-liquid separation system is suitable for a clothes dryer or the like.

BEST MODE FOR CARRYING OUT THE INVENTION

Figure 3A:
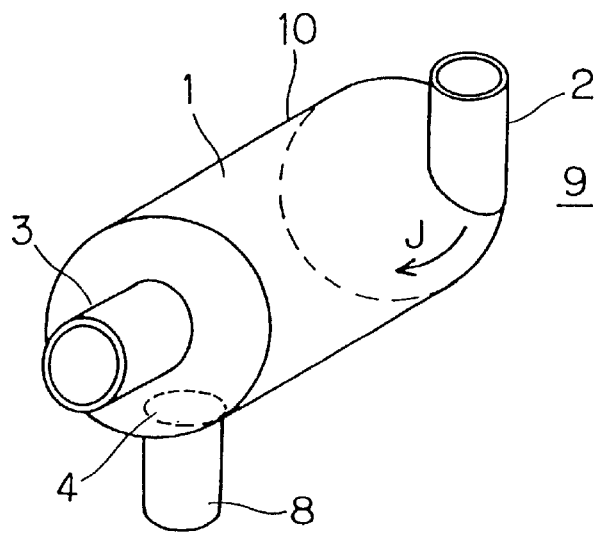
FIGS. 3A, 3B, and 3C are a perspective view, a front view, and a vertical sectional view of the vortex-stream gas-liquid separator of a first embodiment of the present invention.
Figure 3B:
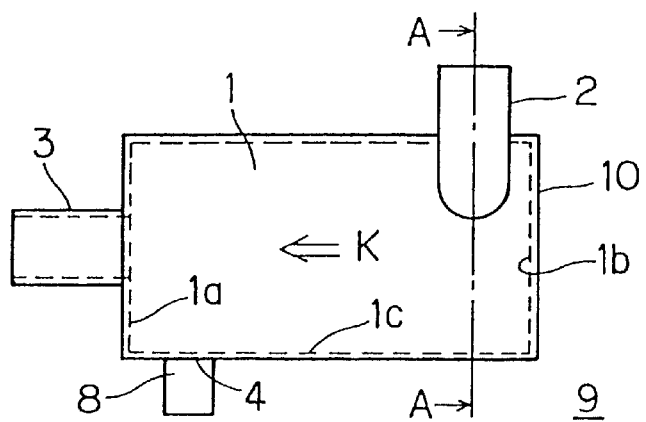
Figure 3C:
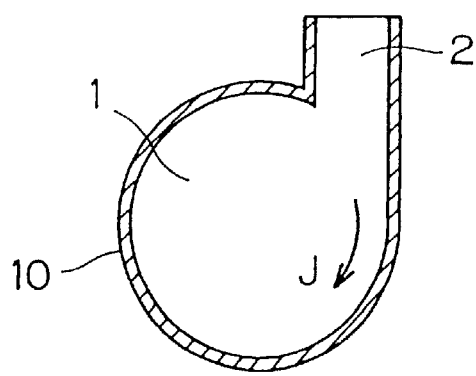

Hereinafter, vortex-stream gas-liquid separators embodying the present invention will be described with reference to the accompanying drawings. FIG. 3A is a perspective view of the vortex-stream gas-liquid separator of a first embodiment of the present invention, FIG. 3B is a front view thereof, and FIG. 3C is a sectional view thereof taken along the line A—A shown in FIG. 3B. This vortex-stream gas-liquid separator 9 has a cylindrical casing 10, of which the inner wall surface forms a cylindrical fluid passage 1. This vortex-stream gas-liquid separator 9 is arranged horizontally with the center axis thereof lying horizontally.

At one end of the fluid passage 1, a fluid inlet 2 is provided so as to protrude outward along a line tangential to the circular cross section of the fluid passage 1. At the other end of the fluid passage 1, a gas outlet 3 is provided so as to protrude outward coaxially with the fluid passage 1. Near this end of the fluid passage 1 where the gas outlet 3 is provided, a liquid outlet 4 is formed in a lower portion of the cylindrical surface 1c of the casing 10. Below the casing 10, a cylindrical drain outlet 8 is provided so as to protrude outward that communicates with the liquid outlet 4 so as to discharge the droplets of the separated liquid flowing from the fluid passage 1.

The gas-liquid two-phase fluid introduced through the fluid inlet 2 into the fluid passage 1 along a line tangential to the circular cross section thereof forms a vortex stream that whirls circularly (in the direction indicated by an arrow J) along the inner wall of the casing 10 (which defines the circumferential surface of the fluid passage 1) as it passes through the fluid passage 1 in the direction indicated by an arrow K. Meanwhile, the droplets of the liquid contained in the gas-liquid two-phase fluid collide with and are condensed on the inner wall of the casing 10. The droplets of the liquid that have condensed on the inner wall of the casing 10 then flow downward along the inner wall of the casing 10, i.e. along the circularly whirling vortex stream, and meanwhile flow in the direction indicated by the arrow K, until they are eventually discharged through the liquid outlet 4 and then the drain outlet 8. While the droplets of the liquid are being removed in this way, the gas-liquid two-phase fluid advances horizontally until it reaches the gas outlet 3, through which the gas that remains after the removal of the droplets of the liquid is discharged.

In this structure, the fluid inlet 2 for introducing the gas-liquid two-phase fluid is provided at one end surface 1b of the fluid passage 1, and the gas outlet 3 is provided at the other end surface 1a opposite to the end surface 1b. Thus, the gas is discharged without its flow direction being reversed. This helps minimize pressure loss. Moreover, the liquid outlet 4 is provided in that half of the fluid passage 1 closer to the gas outlet. This permits the droplets of the liquid, after reaching the liquid outlet 4, to flow into it efficiently so as to be discharged through the drain outlet 8. The closer the liquid outlet 4 is to the gas outlet side end surface 1a, the better.

Figure 4A:
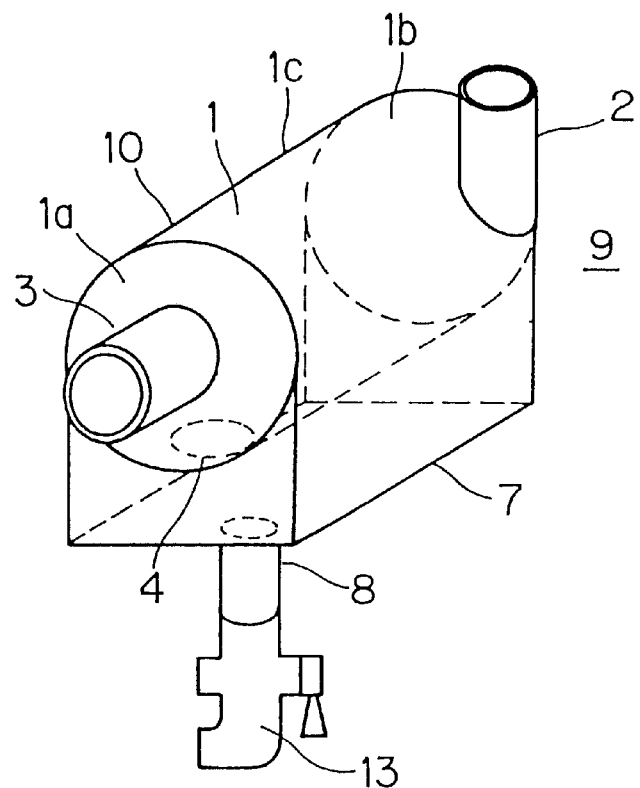
FIGS. 4A and 4B are a perspective view and a front view, respectively, of the vortex-stream gas-liquid separator of a second embodiment of the present invention.
Figure 4B:
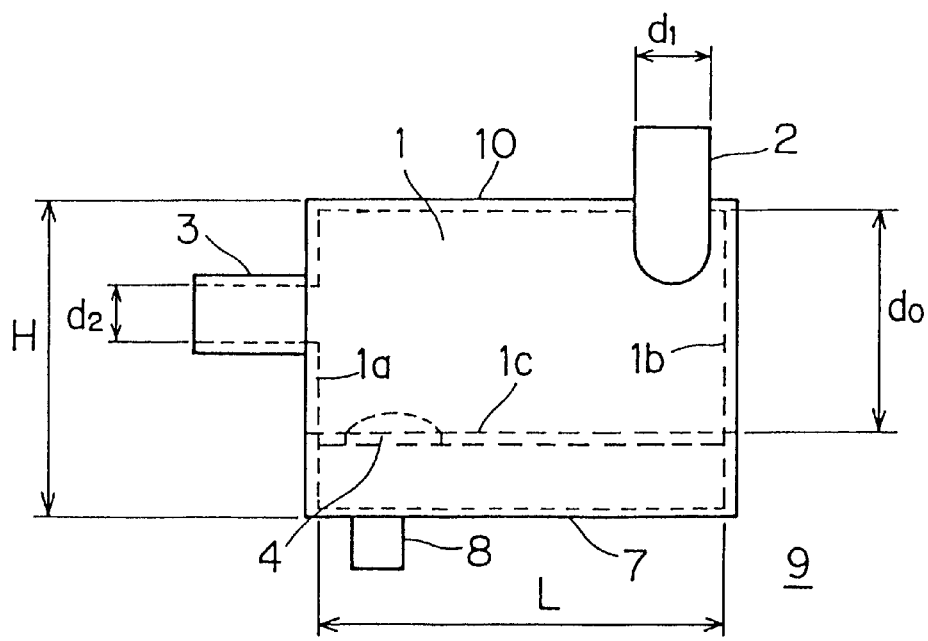

FIG. 4A is a perspective view of the vortex-stream gas-liquid separator 9 of a second embodiment of the present invention, and FIG. 4B is a front view thereof. This vortex-stream gas-liquid separator 9 has a cylindrical casing 10, of which the inner wall surface forms a columnar fluid passage 1. This vortex-stream gas-liquid separator 9 is arranged horizontally with the center axis thereof lying horizontally.

At one end of the fluid passage 1, a fluid inlet 2 is provided so as to protrude outward along a line tangential to the circular cross section of the fluid passage 1. At the other end of the fluid passage 1, a gas outlet 3 is provided so as to protrude outward coaxially with the fluid passage 1. Near this end of the fluid passage 1 where the gas outlet 3 is provided, a liquid outlet 4 is formed in a lower portion of the cylindrical surface 1c of the casing 10. Below the casing 10, a liquid collection reservoir 7 is provided that communicates with the fluid passage 1 through the liquid outlet 4. The liquid collection reservoir 7 is for collecting the droplets of the separated liquid, and has a drain outlet 8 and a valve 13 provided in a lower portion thereof.

In this structure, the valve 13 permits the drain outlet 8 to be closed, and thus permits the gas to be discharged wholly through the gas outlet. Moreover, it is possible to introduce the gas-liquid two-phase fluid into the fluid passage 1 through the fluid inlet 2 not only by blowing it in through the fluid inlet 2 but also by sucking it out through the gas outlet 3. Thus, the vortex-stream gas-liquid separator of this embodiment finds wider application. The droplets of the liquid collected in the liquid collection reservoir 7 are stored therein until discharged at an appropriate time.

Figure 1A:
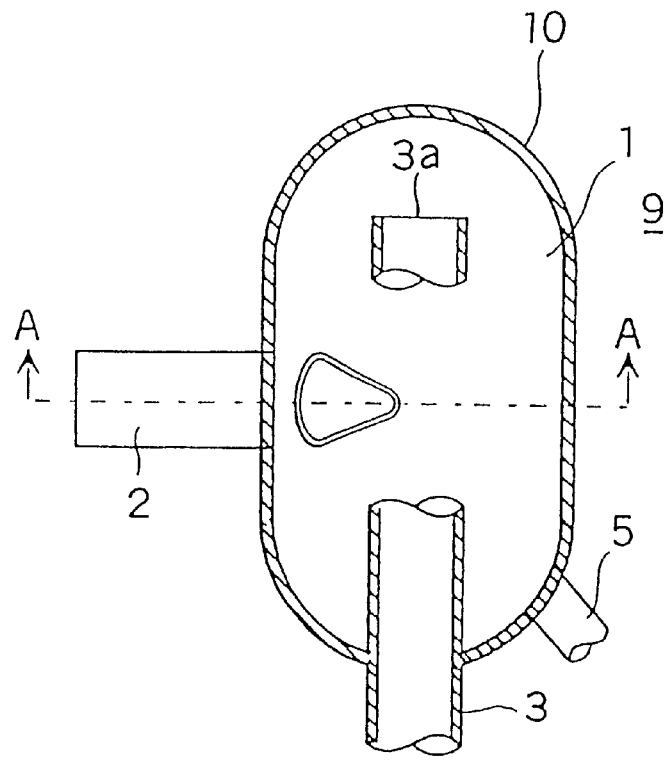
FIGS. 1A and 1B are a vertical sectional view and a horizontal sectional view, respectively, of a conventional vertical-type vortex-stream gas-liquid separator.
Figure 1B:
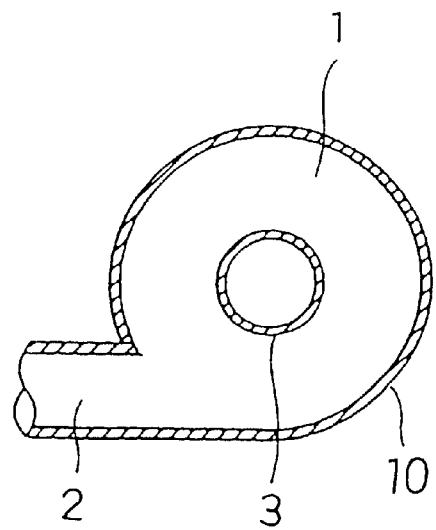
Figure 2A:
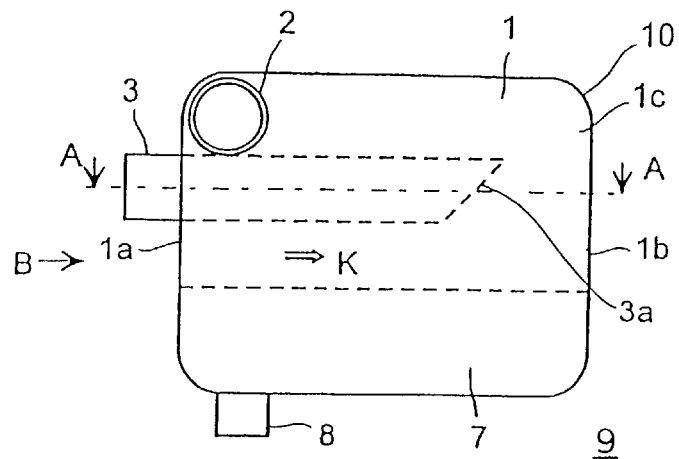
FIGS. 2A, 2B, and 2C are a front view, a side view, and a horizontal sectional view, respectively, of a conventional horizontal-type vortex-stream gas-liquid separator.
Figure 2B:
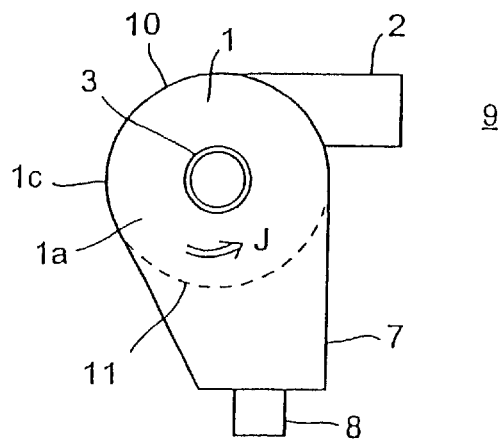
Figure 2C:
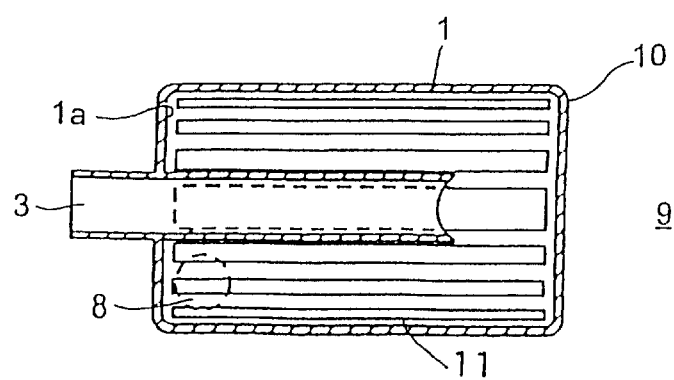

Moreover, the fluid passage 1 communicates with the liquid collection reservoir 7 not through slits (see FIG. 2B) that are formed so as to extend over almost the entire length of the fluid passage 1 but only through the liquid outlet 4 that is formed as a hole having a much shorter length. This permits most of the gas contained in the gas-liquid two-phase fluid introduced through the fluid inlet 2 into the fluid passage 1 to be discharged through the gas outlet 3 without flowing into the liquid collection reservoir 7, and thus prevents the gas-liquid two-phase fluid from containing again the droplets of the liquid collected.

Moreover, as in the first embodiment, the liquid outlet 4 is provided in that half of the fluid passage 1 closer to the gas outlet side end surface 1a thereof, and therefore, as the gas-liquid two-phase fluid approaches the gas outlet 3 provided at the end surface 1a of the fluid passage 1, the droplets of the liquid are guided toward the liquid outlet 4. In addition, the gas outlet 3 is provided in the direction in which the gas-liquid two-phase fluid advances, and therefore the gas, after the removal of the droplets of the liquid, is discharged smoothly, with minimal pressure loss.

To obtain the optimum gas-liquid separation performance with the vortex-stream gas-liquid separators of the embodiments thus far described, it is essential to make as many droplets as possible of the liquid contained in the gas-liquid two-phase fluid collide with the inner wall of the casing 10. To achieve this, it is preferable to let the gas-liquid two-phase fluid introduced through the fluid inlet 2 into the fluid passage 1 make half a turn or more along the inner wall of the casing 10 so that collision occurs over as large an area as possible thereon.

Let us now confirm that, under normal use conditions, the gas-liquid two-phase fluid certainly makes half a turn or more inside the fluid passage 1. Here, as shown in FIG. 4B, it is assumed that the diameter of the fluid passage 1 of the vortex-stream gas-liquid separator 9 is d0, the internal diameter of the fluid inlet 2 is d1, the internal diameter of the gas outlet 3 is d2, the height of the vortex-stream gas-liquid separator 9 is H, and the length of the fluid passage 1 is L.

The velocity of the gas-liquid two-phase fluid introduced through the fluid inlet 2 into the fluid passage 1 gradually decreases as the fluid whirls circularly, and eventually settles down to a stable terminal velocity ut. Provided that the Reynolds number Re is in a range $$2 < Re < 500,$$

then the terminal velocity ut (m/s) is given by $$ut = \{(4/225) \cdot (\rho s - \rho f)^2 \cdot (r \cdot \omega^2)^2 / (\mu \cdot \rho f)\}^{1/3} \cdot Ds, \quad (1)$$

where ρs represents the density (kg/m³) of the liquid droplets, ρf represents the density (kg/m³) of the gas, μ represents the viscosity (Pa·s) of the gas, r represents the radius (m) of the vortex stream of the liquid droplets, ω represents the angular velocity (rad/s) of the vortex stream of the liquid droplets, and Ds represents the diameter (m) of the liquid droplets.

Now, suppose that the vortex-stream gas-liquid separator 9 has the following typical dimensions:

| | |
|---|---|
| Diameter of Fluid Passage 1 | d0 = 0.055 (m) |
| Internal Diameter of Fluid Inlet 2 | d1 = 0.03 (m) |
| Internal Diameter of Gas Outlet 3 | d2 = 0.03 (m) |
| Length of Fluid Passage 1 | L = 0.11 (m) |
| Radius of Liquid Droplets Vortex Stream | r = d0/2 = 0.0275 (m) |
| Height of Separator 9 | H = 0.065 (m) |

In addition, suppose that the gas-liquid two-phase fluid has the following characteristics, as is exemplified by air containing water droplets suspended in it:

| | |
|---|---|
| Density of Liquid Droplets | ρs = 1000 (kg/m³) |
| Density of Gas | ρf = 1.293 (kg/m³) |
| Viscosity of Gas | μ = 0.01822 × 10⁻³ (Pa · s) |
| Diameter of Liquid Droplets | Ds = 10⁻⁴ (m) |

Here, if the flow rate Q of the gas-liquid two-phase fluid introduced into the vortex-stream gas-liquid separator 9 is assumed to be $$Q = 1.6 \ (m^3/min)$$
$$= 0.0267 \ (m^3/min),$$

then, the time T that the introduced gas-liquid two-phase fluid takes to reach the gas outlet 3 is $$T = 0.0098 \ (s).$$

If it is assumed that the gas-liquid two-phase fluid has made half a turn when it reaches the gas outlet 3, its tangential velocity vt at that moment is $$vt = r\omega = r\pi/T = 8.82 \ (m/s),$$

and the terminal velocity ut and the Reynolds number Re are $$ut=18.19 \text{ (m/s) and } Re=129.1,$$

respectively.

This value of the Reynolds number Re indicates that it is proper to determine the terminal velocity ut on the basis of Formula (1). Here, comparing the product of the terminal velocity ut and the time T required to traverse the fluid passage 1 with the vortex stream radius r of the gas-liquid two-phase fluid results $$ut \cdot T \text{ (0.178 m)} > r(0.0275 \text{ m}).$$

This relation indicates that the gas-liquid two-phase fluid certainly reaches the outer circumference of the fluid passage 1, i.e. the gas-liquid two-phase fluid certainly collides with the inner wall of the casing 10.

On the other hand, the average flow velocity v of the gas-liquid two-phase fluid introduced into the fluid passage 1 as determined from the internal diameter of the fluid inlet 2 and the flow rate noted above is $$v=37.73 \text{ (m/s)},$$

and hence the average flow velocity v of the introduced gas-liquid two-phase fluid and the tangential velocity vt of the gas-liquid two-phase fluid that has reached the gas outlet 3 have a relation $$v \text{ (37.73 m/s)} > vt(8.82 \text{ m/s}).$$

The fact that the average flow velocity v of the gas-liquid two-phase fluid introduced into the fluid passage 1 is greater than the tangential velocity vt indicates that, although the velocity of the gas-liquid two-phase fluid gradually decreases as it passes through the fluid passage 1, the gas-liquid two-phase fluid keeps its tangential velocity sufficiently high to allow itself to make half a turn or more until it reaches the gas outlet 3.

Accordingly, certainly the gas-liquid two-phase fluid makes half a turn or more inside the vortex-stream gas-liquid separator 9, and meanwhile collides with the inner wall of the casing 10. Thus, the configuration described above guarantees the droplets of the liquids to collide with the inner wall of the casing 10, and thereby permits the vortex-stream gas-liquid separator 9 to offer the optimum separation performance. Also if the flow rate Q of the gas-liquid two-phase fluid is assumed to be 1.0 (m³/min), it is possible, by similar calculations, to confirm that the gas-liquid two-phase fluid makes half a turn or more inside the vortex-stream gas-liquid separator 9.

It is to be understood that the specific dimensions presented above are merely those of a typical example of the vortex-stream gas-liquid separator of this embodiment, and that also the characteristics and flow rate presented above of the gas-liquid two-phase fluid are merely those of a typical example of such fluid; that is, the vortex-stream gas-liquid separator of this embodiment may have different dimensions, and may be used for the separation of gas-liquid two-phase fluid having different characteristics. What is important here is that as many droplets as possible of the liquid need to be made to collide with the inner wall of the casing 10, and that, to achieve this, it is preferable to let the gas-liquid two-phase fluid introduced through the fluid inlet 2 into the fluid passage 1 make half a turn or more, with the flow rate of the gas-liquid two-phase fluid adjusted in accordance with its characteristics.

Figure 5A:
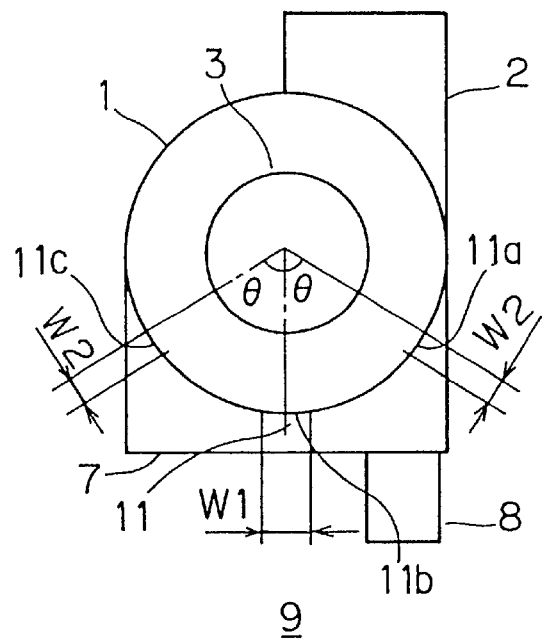
FIGS. 5A and 5B are a side view and a front view, respectively, of the vortex-stream gas-liquid separators used in the first to sixth experiments.

Next, six experiments conducted to test the gas-liquid separation performance of the vortex-stream gas-liquid separator 9 will be described. These experiments, hereafter referred to as the first to six experiments respectively, were conducted with vortex-stream gas-liquid separators 9 having the same geometry (shape and dimensions) as presented above and having liquid outlet slits 11a, 11b, and 11c formed as shown in FIGS. 5A and 5B, but with different sizes of the liquid outlet by closing a part or the whole of one or more of these slits 11a, 11b, and 11c in various ways with adhesive tape.

The slit 11b is formed in the lower portion of the casing 10 so as to have a width W1=6 mm. The slits 11a and 11c are formed on both sides of the slit 11b, at an angle θ=45° about the center axis of the fluid passage 1, so as to have a width W2=3 mm. These slits 11a, 11b, and 11c are all formed so as to extend from the gas outlet 3 side end 1a of the casing up to a position 110 mm away therefrom; that is, they each have a length Lx=110 mm.

Figure 5B:
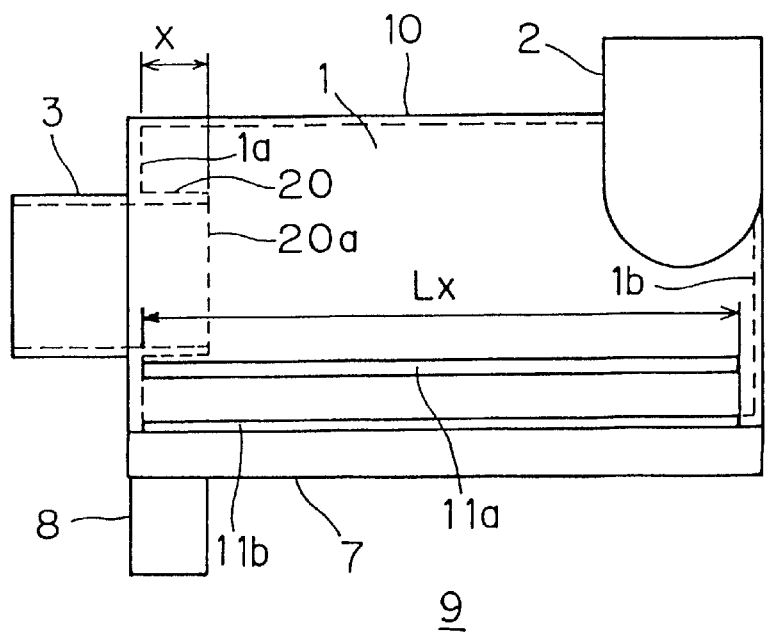

Moreover, as shown in FIG. 5B, the gas outlet 3 is provided with a discharge pipe 20 that is so formed as to protrude inward into the fluid passage 1 as if being an extension of the gas outlet 3. Thus, the gas flows through the opening 20a of this discharge pipe 20 to the gas outlet 3. Here, the length x by which the discharge pipe 20 protrudes into the fluid passage 1 (hereafter referred to as "the protrusion length" is variable.

Figure 6A:
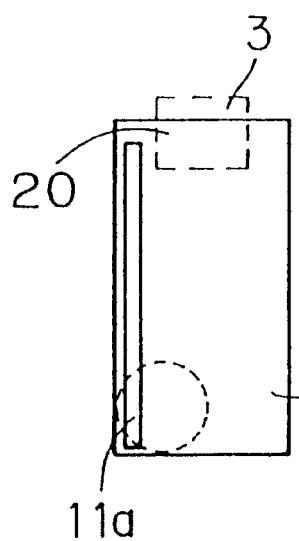
FIGS. 6A, 6B, and 6C are plan views of the vortex-stream gas-liquid separators used in the first experiment, with FIG. 6C showing the vortex-stream gas-liquid separator of a third embodiment of the present invention.
Figure 6B:
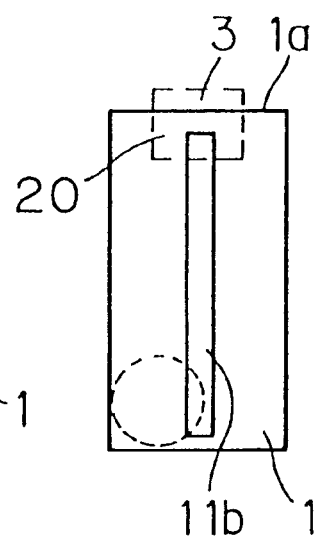
Figure 6C:
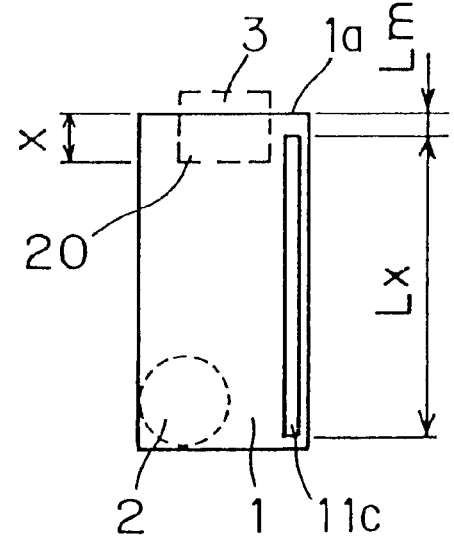

FIGS. 6A, 6B, and 6C schematically show the vortex-stream gas-liquid separators 9A, 9B, and 9C, respectively, used in the first experiment, as seen from above. The aim of the first experiment is to study the influence of the position of a slit on the liquid droplet separation performance. Here, the flow rate of the gas-liquid two-phase fluid is 1.0 m³/min. In the following descriptions, the gas outlet 3 side end of a slit is referred to as its "end position", and the distance from the gas outlet 3 side end surface 1a of the fluid passage 1 to this end position is represented by Lm.

In each of the vortex-stream gas-liquid separators 9A, 9B, and 9C, only one of the slits 11a, 11b, and 11c, respectively, is left open from its end position Lm=10 mm up to a position Lx=110 mm away therefrom, with the remainder of this slit and the whole of each of the other two slits closed. The discharge pipe 20 has a protrusion length x=20 mm, and has an opening 20a at its end. The configuration shown in FIG. 6C corresponds to a third embodiment of the present invention.

Figure 7:
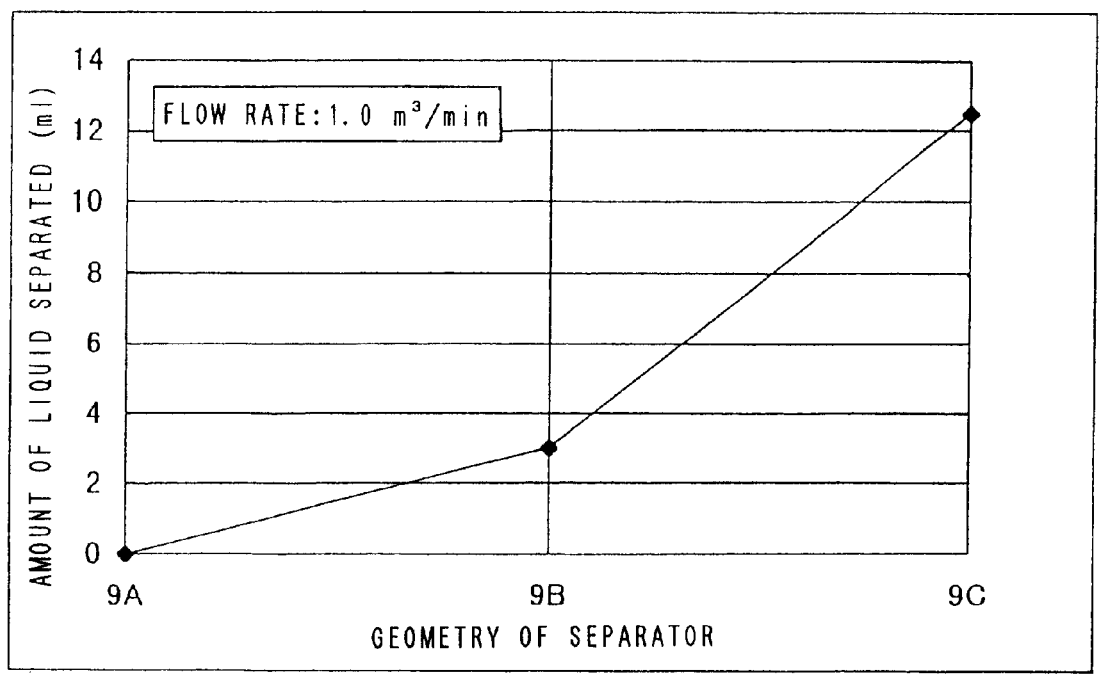
FIG. 7 is a diagram showing the results of the first experiment.

The results of the first experiment are shown in FIG. 7. In this figure, the amount of liquid separated is taken along the vertical axis, and the vortex-stream gas-liquid separators 9A, 9B, and 9C are lined up along the horizontal axis. FIG. 7 shows that, if the flow rate of the gas-liquid two-phase fluid is 1.0 m³/min, the highest gas-liquid separation performance is achieved when a slit is formed farthest away from the inflow position of the gas-liquid two-phase fluid along the path of the vortex stream (9C). This can be ascribed to the fact that, if the slit 11a or 11b is formed nearer to the fluid inlet 2 along the direction of the vortex stream inside the fluid passage 1, the gas-liquid two-phase fluid flows into the liquid collection reservoir 7 before being able to form an effective circularly whirling vortex stream.

Figure 8A:
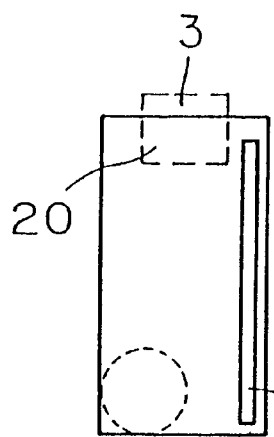
FIGS. 8A, 8B, and 8C are plan views of the vortex-stream gas-liquid separators used in the second experiment, with FIGS. 8B and 8C showing the vortex-stream gas-liquid separators of a fourth and a fifth embodiment, respectively, of the present invention.
Figure 8B:
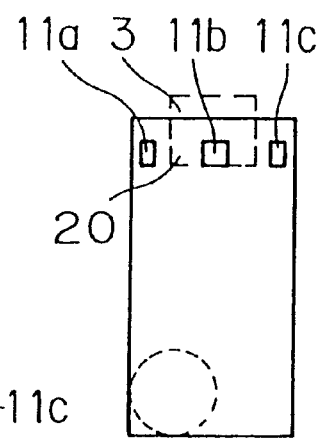
Figure 8C:
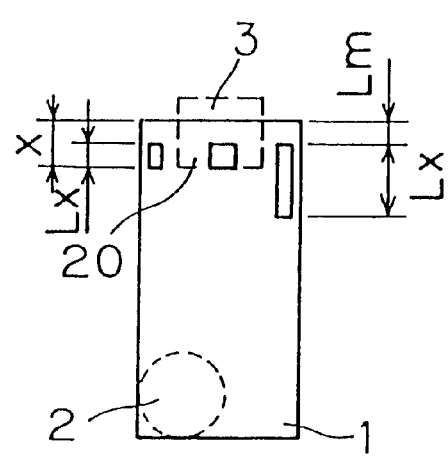

FIGS. 8A, 8B, and 8C schematically show the vortex-stream gas-liquid separators 9C, 9D, and 9E, respectively, used in the second experiment, as seen from above. The aim of the second experiment is to study the influence of the size of a slit on the liquid droplet separation performance. Here, the flow rate of the gas-liquid two-phase fluid is 1.6 m³/min.

FIG. 8A shows, for comparison, the same vortex-stream gas-liquid separator 9C as shown in FIG. 6C. FIG. 8B shows the vortex-stream gas-liquid separator 9D of a fourth embodiment of the present invention. Here, the length of the slits 11a, 11b, and 11c is Lx=10 mm, their end position is Lm=10 mm, and the protrusion length is x=20 mm. FIG. 8C shows the vortex-stream gas-liquid separator 9E of a fifth embodiment of the invention. Here, the length of the slits 11a and 11b is Lx=10 mm, the length of the slit 11c is Lx=30 mm, the end position of all the slits 11a, 11b, and 11c is Lm=10 mm, and the protrusion length is x=20 mm.

Figure 9A:
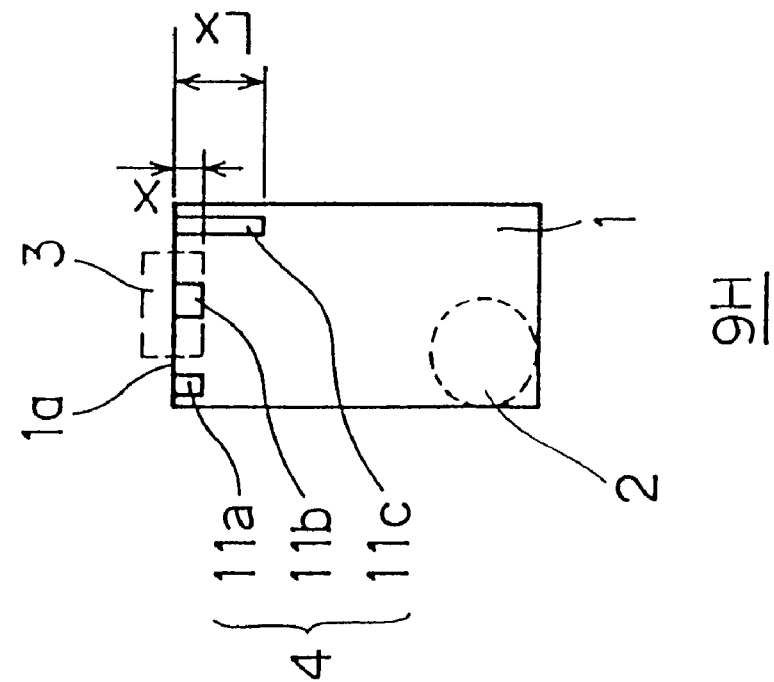
FIGS. 9A, 9B, and 9C are plan views of the vortex-stream gas-liquid separators used in the third experiment, with FIGS. 9B and 9C showing the vortex-stream gas-liquid separators of a sixth and a seventh embodiment, respectively, of the present invention.
Figure 9B:
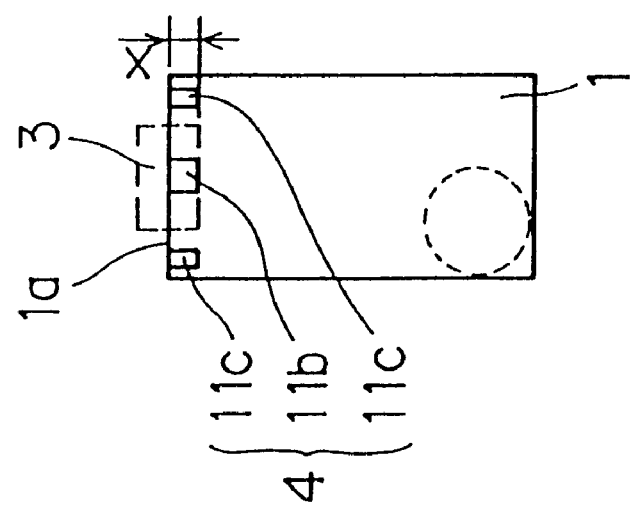
Figure 9C:
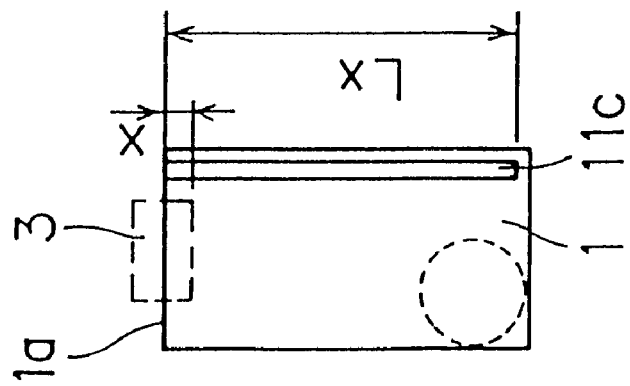

FIGS. 9A, 9B, and 9C schematically show the vortex-stream gas-liquid separators 9F, 9G, and 9H, respectively, used in the third experiment, as seen from above. The aim of the third experiment is to study the influence of the position of a slit on the liquid droplet separation performance. Here, the flow rate of the gas-liquid two-phase fluid is 1.6 m$^3$/min.

FIG. 9A shows a vortex-stream gas-liquid separator 9F that differs from the vortex-stream gas-liquid separator 9C in that the slit 11a has its end position exactly at the gas outlet side end surface 1a. Here, the length of the slit 11a is Lx=100 mm, its end position is Lm=0 mm, and the protrusion length is x=10 mm. FIG. 9B shows the vortex-stream gas-liquid separator 9G of a sixth embodiment of the present invention that differs from the vortex-stream gas-liquid separator 9D in that the slits 11a, 11b, and 11c have their end positions exactly at the gas outlet side end surface 1a. Here, the length of the slits 11a, 11b, and 11c is Lx=10 mm, their end position is Lm=0 mm, and the protrusion length is x=10 mm. FIG. 9C shows the vortex-stream gas-liquid separator 9H of a seventh embodiment of the present invention that differs from the vortex-stream gas-liquid separator 9E in that the slits 11a, 11b, and 11c have their end positions exactly at the gas outlet side end surface 1a. Here, the length of the slits 11a and 11b is Lx=10 mm, the length of the slit 11c is Lx=30 mm, the end position of all the slits 11a, 11b, and 11c is Lm=0 mm, and the protrusion length is x=10 mm.

Here, since it is expected from the results of the first experiment that higher gas-liquid separation performance is achieved by locating the liquid outlet 4 farther away from the inflow point in the direction of the vortex stream of the introduced gas-liquid two-phase fluid, no experiments were conducted with the liquid outlet 4 located exclusively close to the fluid inlet 2.

Figure 10:
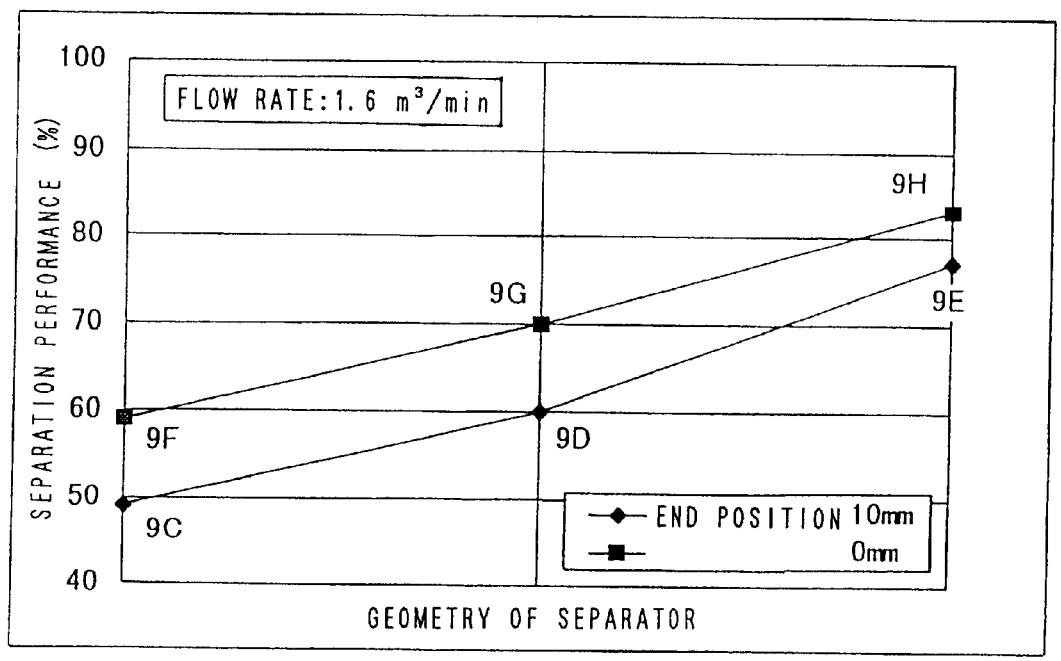
FIG. 10 is a diagram showing the results of the second and third experiments.

The results of the second and third experiments are shown in FIG. 10. In this figure, the gas-liquid separation performance, given as the ratio of the amount of separated liquid to the amount of liquid contained as droplets in the introduced gas-liquid two-phase fluid, is taken along the vertical axis, and the vortex-stream gas-liquid separators 9C, 9D, and 9E, and 9F, 9G, and 9H are lined up in two groups along the horizontal axis.

FIG. 10 shows, if the flow rate is 1.6 m$^3$/min, the vortex-stream gas-liquid separators 9D and 9E offer higher separation performance than the vortex-stream gas-liquid separator 9C. That is, to enhance the separation performance, it is effective to locate the slits 11a, 11b, and 11c by the side of the gas outlet 3, and shorten the length Lx of the silts 11a, 11b, and 11c. These results prove the advantageous effects of the first and second embodiments. Moreover, the vortex-stream gas-liquid separators 9F, 9G, and 9H offer higher separation performance than the vortex-stream gas-liquid separators 9C, 9D, and 9E. This shows that, to enhance the separation performance, it is effective to form the silts 11a, 11b, and 11c in such a way that they reach the gas outlet side end surface 1a of the fluid passage 1.

FIGS. 11A to 11E show the vortex-stream gas-liquid separators 9C', 9F', 9D', 9G', and 9H', respectively, used in the fourth experiment. The aim of the fourth experiment is to study the influence of the protruding length of the discharge pipe 20 on the liquid droplet separation performance. Here, the flow rate of the gas-liquid two-phase fluid is 1.0 m$^3$/m.

Figure 11:
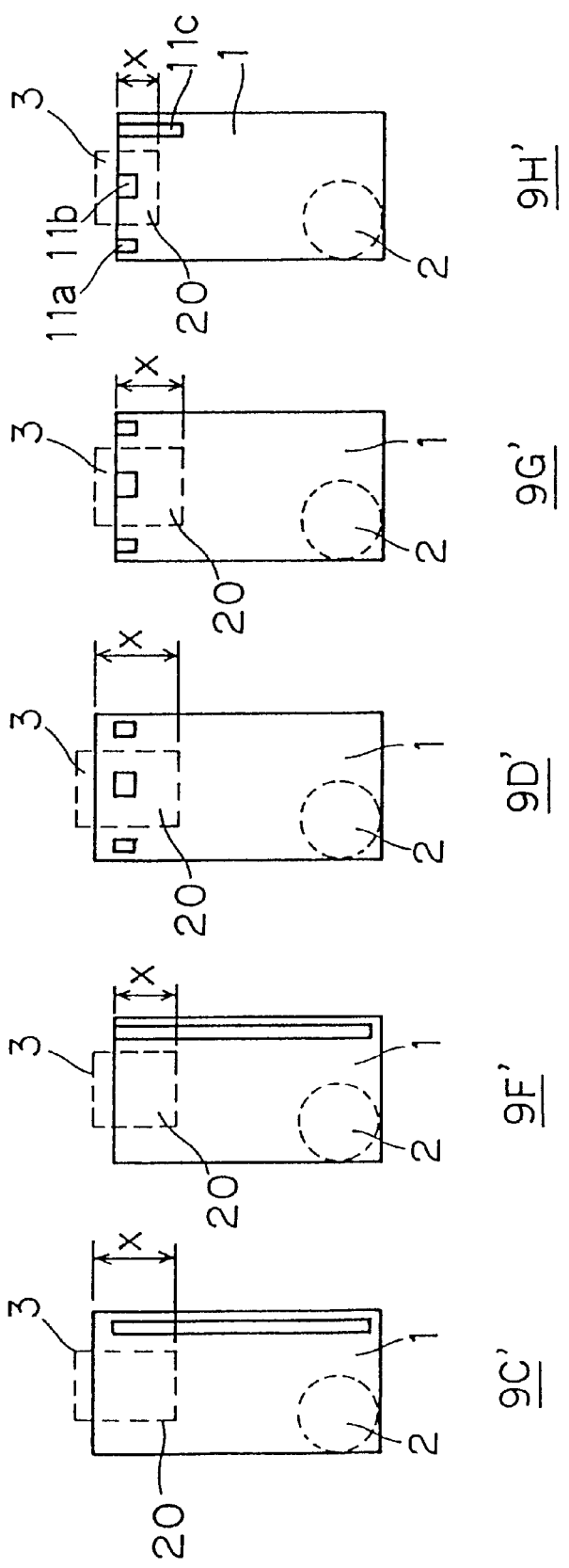
FIGS. 11A to 11E are plan views of the vortex-stream gas-liquid separators used in the fourth experiment.

FIG. 11A shows a vortex-stream gas-liquid separator 9C' that differs from the vortex-stream gas-liquid separator 9C in that the protrusion length x is variable. Here, the length of the slit is Lx=100 mm and its end position is Lm=10 mm. FIG. 11B shows a vortex-stream gas-liquid separator 9F' that differs from the vortex-stream gas-liquid separator 9F in that the protrusion length x is variable. Here, the length of the slit is Lx=100 mm and its end position is Lm=0 mm. FIG. 11C shows a vortex-stream gas-liquid separator 9D' that differs from the vortex-stream gas-liquid separator 9D in that the protrusion length x is variable. Here, the length of the slits is Lx=10 mm and their end position is Lm=10 mm.

FIG. 11D shows a vortex-stream gas-liquid separator 9G' that differs from the vortex-stream gas-liquid separator 9G in that the protrusion length x is variable. Here, the length of the slits is Lx=10 mm and their end position is Lm=0 mm. FIG. 11E shows a vortex-stream gas-liquid separator 9H' that differs from the vortex-stream gas-liquid separator 9H in that the protrusion length x is variable. Here, the length of the slits 11a and 11b is Lx=10 mm, the length of the slit 11c is Lx=30 mm, and the end position of all the slits 11a, 11b, and 11c is Lm=0 mm.

Figure 12:
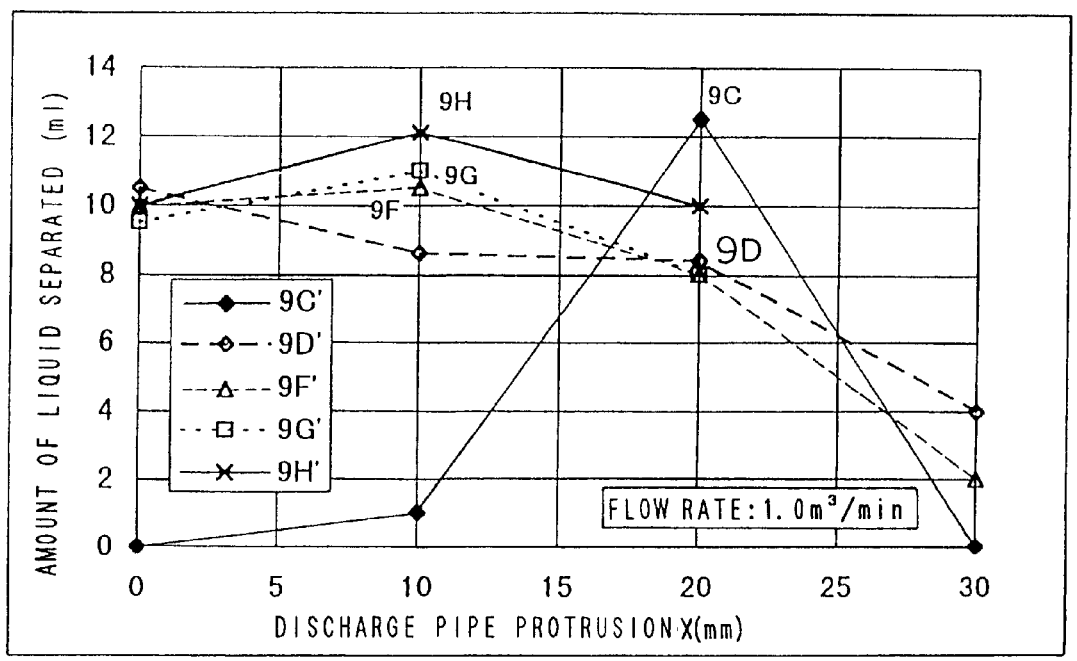
FIG. 12 is a diagram showing the results of the fourth experiment.

The results of the fourth experiment are shown in FIG. 12. In this figure, the amount of liquid separated is taken along the vertical axis, and the protrusion length x of the discharge pipe 20 is taken along the horizontal axis. Here, the vortex-stream gas-liquid separators having the same structures as those used in the first to third experiments are indicated by the symbols representing the corresponding vortex-stream gas-liquid separators.

FIG. 12 shows that, if the flow rate of the gas-liquid two-phase fluid is 1.0 m$^3$/min, higher separation performance is achieved when the discharge pipe 20 is formed so as to protrude into the fluid passage 1 with a length of about 10 to 20 mm than when no discharge pipe 20 is provided, with the exception of the vortex-stream gas-liquid separator 9D'. The vortex-stream gas-liquid separator 9C offers the highest separation performance. Moreover, FIG. 12 also shows that the separation performance depends on the protrusion length x, and that there exists an optimum value of the protrusion length x. It is expected that, even if the flow rate of the gas-liquid two-phase fluid is higher, there still exits an optimum value of the protrusion length x; therefore, even if the flow rate of the gas-liquid two-phase fluid is higher, it is possible to enhance the separation performance by selecting an appropriate protrusion length x.

Figure 13A:
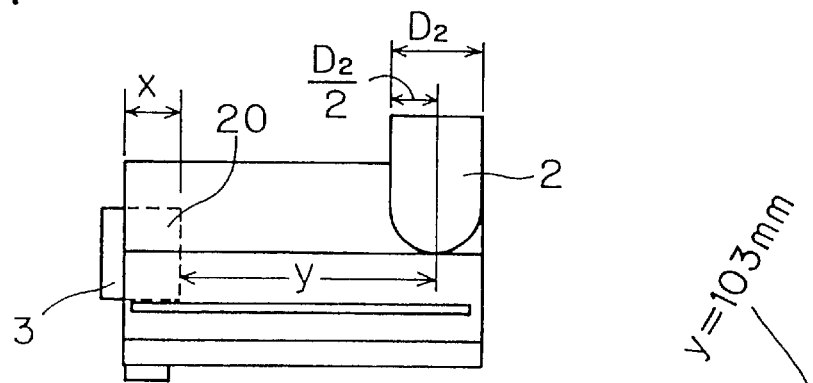
FIG. 13A is a diagram showing the geometry of the vortex-stream gas-liquid separator used in the fifth experiment.
Figure 13B:
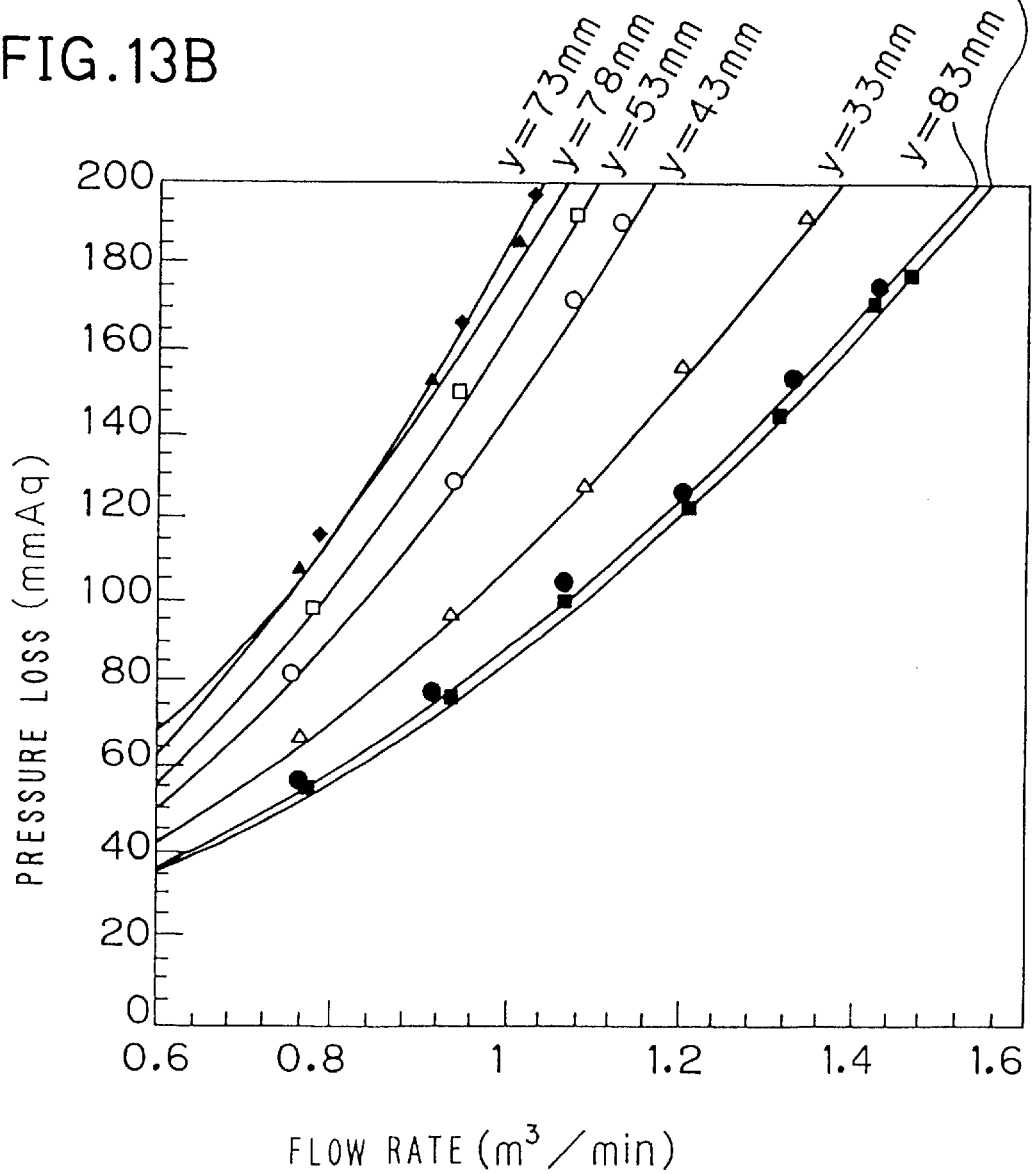
FIG. 13B is a diagram showing the results of the fifth experiment.

The fifth experiment was conducted with a vortex-stream gas-liquid separator having the same structure as the vortex-stream gas-liquid separator 9C', and the aim of this experiment is to study the relationship between the protrusion length x and the pressure loss. The geometry of the vortex-stream gas-liquid separator used in this experiment and the results of the experiment are shown in FIGS. 13A and 13B. As shown in FIG. 13A, y represents the distance from the center of the fluid inlet 2 to the inner end of the discharge pipe 20 that protrudes into the casing 1 (hereafter, this distance is referred to as the "fluid traverse distance"). Here, for the purpose of experiment, the fluid passage 1 is formed to have a longer length L than in the vortex-stream gas-liquid separator 9C', and the internal diameter of the fluid inlet 2 is d=30 mm. In FIG. 13B, the pressure loss, given in mmAq, is taken along the vertical axis, and the flow rate, given in m³/min, of the gas-liquid two-phase fluid is taken along the horizontal axis.

FIG. 13B shows that the pressure loss is at a maximum when the fluid traverse distance is y=73 mm, and that, the longer the fluid traverse distance, the lower the pressure loss. To minimize the pressure loss, the discharge pipe 20 is better omitted. However, in the region where the fluid traverse distance y is 83 mm or longer, the pressure loss remains roughly constant at comparatively low values, and therefore, by selecting an appropriate length of the discharge pipe 20 within a range where satisfactory separation performance is achieved as in such a region where the pressure loss is saturated, it is possible to realize a vortex-stream gas-liquid separator that offers high separation performance with a minimum of pressure loss. In FIG. 12 described previously, if the protrusion length x is 10 mm, then the fluid traverse distance y is 88 mm.

Figure 14A:
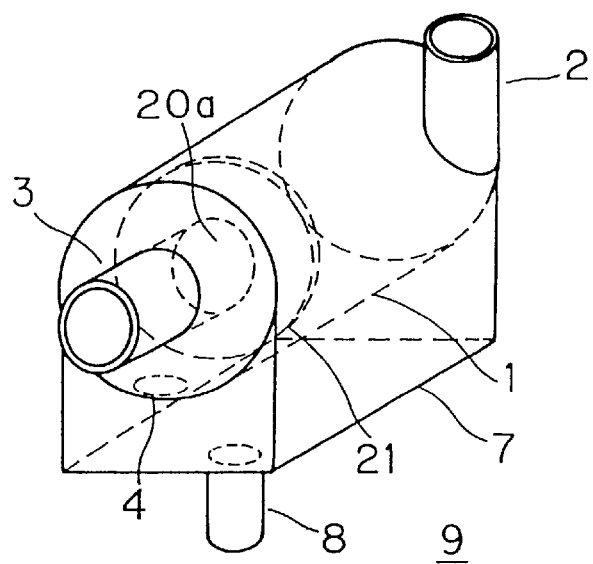
FIGS. 14A and 14B are a perspective view and a front sectional view, respectively, of the vortex-stream gas-liquid separator used in the sixth experiment.
Figure 14B:
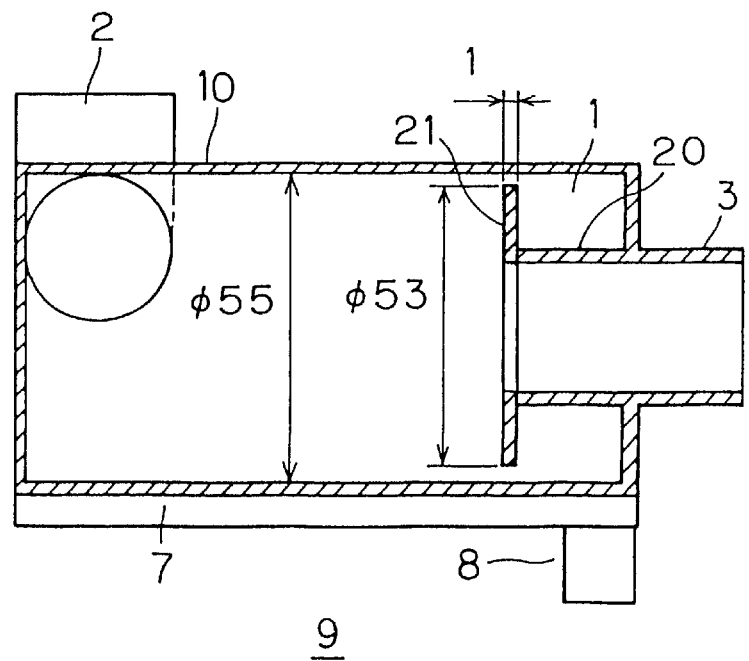
Figure 15A:
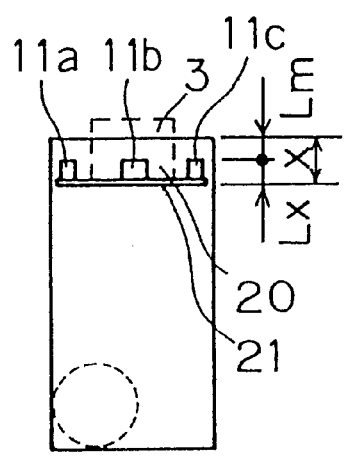
FIGS. 15A, 15B, and 15C are plan views of the vortex-stream gas-liquid separators used in the sixth experiment, with FIGS. 15A, 15B, and 15C showing the vortex-stream gas-liquid separators of an eighth, a ninth, and a tenth embodiment, respectively, of the present invention.
Figure 15B:
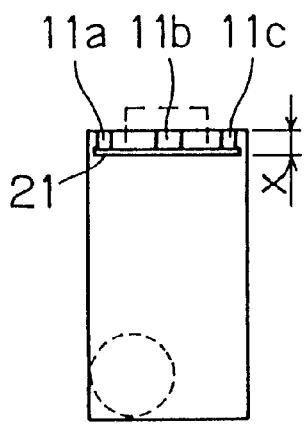
Figure 15C:
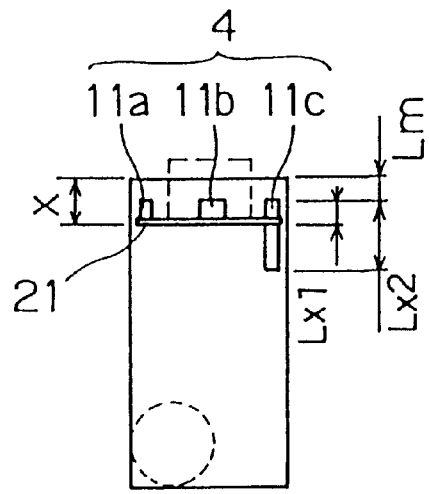

The vortex-stream gas-liquid separator 9 used in the sixth experiment is shown in FIGS. 14A, 14B, 15A, 15B, and 15C. FIG. 14A is a perspective view of the vortex-stream gas-liquid separator 9, and FIG. 14B is a sectional view of the vortex-stream gas-liquid separator 9 as seen from the front. FIGS. 15A, 15B, and 15C are schematic diagrams of the vortex-stream gas-liquid separators 9J, 9K, and 9L as seen from above.

The sixth experiment was conducted with a circular flange, serving as a partition plate, additionally provided at the end surface of the discharge pipe 20 that protrudes into the fluid passage 1, and the aim of this experiment is to study the influence of such a partition plate on the separation performance. The partition plate 21 has a diameter of 53 mm, and a gap of 1 mm is secured between it and the inner wall of the casing 10. Here, the flow rate of the gas-liquid two-phase fluid is 1.6 m³/min.

FIG. 15A shows the vortex-stream gas-liquid separator 9J of an eighth embodiment of the present invention. Here, the protrusion length is x=20 mm, the length of the slits is Lx=10 mm, and their end position is Lm=10 mm. FIG. 15B shows the vortex-stream gas-liquid separator 9K of a ninth embodiment of the present invention. Here, the protrusion length is x=10 mm, the length of the slits is Lx=10 mm, and their end position is Lm=0 mm. FIG. 15C shows the vortex-stream gas-liquid separator 9L of a tenth embodiment of the present invention. Here, the protrusion length is x=20 mm, the length of the slits 11a and 11b is Lx1=10 mm, the length of the silt 11c is Lx2=30 mm, and their end position is Lm=10 mm.

Figure 16:
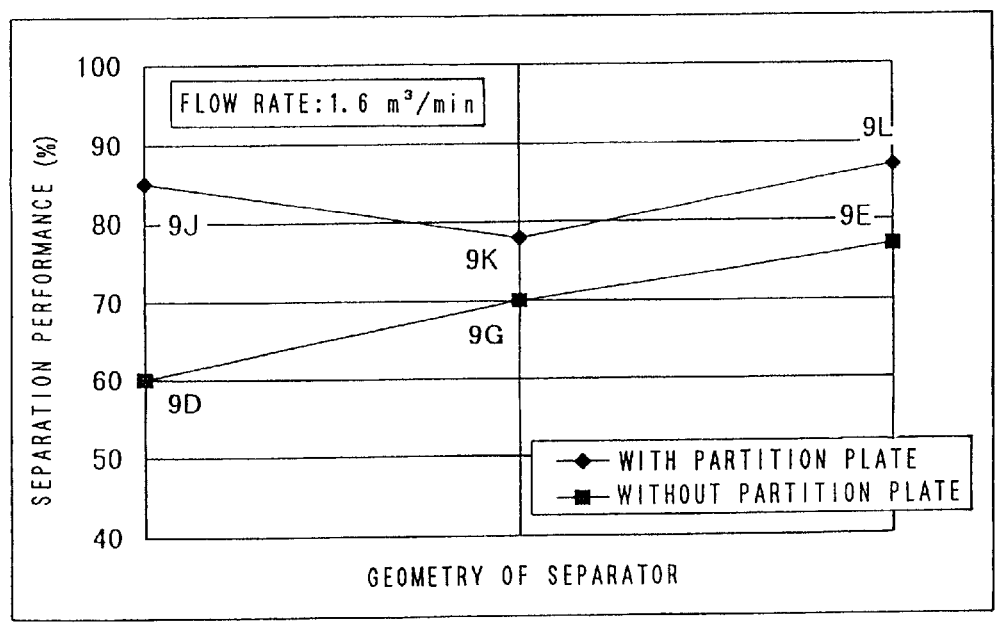
FIG. 16 is a diagram showing the results of the sixth experiment.

The results of the sixth experiment are shown in FIG. 16. In this figure, the separation performance is taken along the vertical axis, and the vortex-stream gas-liquid separators 9J, 9K, and 9L are lined up along the horizontal axis. For comparison, FIG. 6 shows also the results obtained with the vortex-stream gas-liquid separators 9D, 9G, and 9E, which are versions without the partition plate 21 of the vortex-stream gas-liquid separators 9J, 9K, and 9L used in the sixth experiment, by citing the results of the second and third experiments identified with their respective symbols.

FIG. 16 shows that higher gas-liquid separation performance is achieved with the vortex-stream gas-liquid separators 9J, 9K, and 9L provided with a partition plate 21 than with the vortex-stream gas-liquid separators 9D, 9G, and 9E. This can be ascribed to the fact that the partition plate 21 hinders the gas-liquid two-phase fluid from flowing into the liquid collection reservoir 7. In FIG. 15C, whereas the area of that part of the opening of the liquid outlet 4 that lies on that side of the partition plate 21 closer to the gas outlet side end surface 1a of the fluid passage 1 is 120 mm², the area of the remainder of the opening of the liquid outlet 4 that lies on that side of the partition plate 21 closer to the fluid inlet 2 is 60 mm². Accordingly, by arranging the partition plate 21 in such a way that two-thirds or more of the area of the opening of the liquid outlet 4 lies on that side of the partition plate 21 closer to the end surface 1a, it is possible to enhance the gas-liquid separation performance.

Figure 17A:
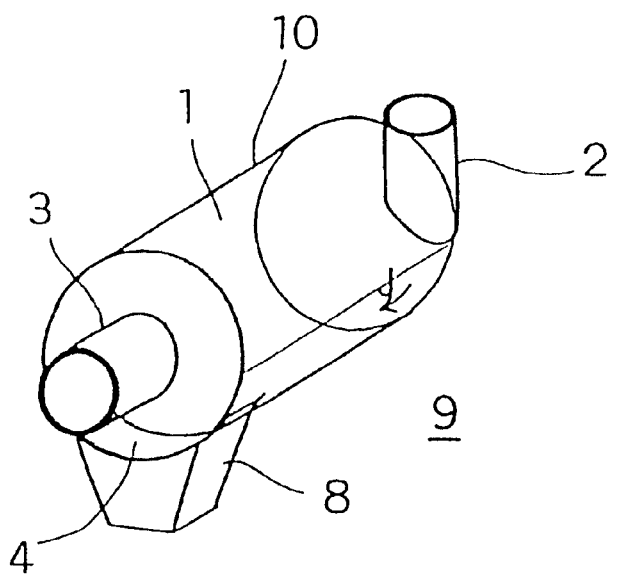
FIGS. 17A and 17B are a perspective view and a front view of the vortex-stream gas-liquid separator of an eleventh embodiment of the present invention.
Figure 17B:
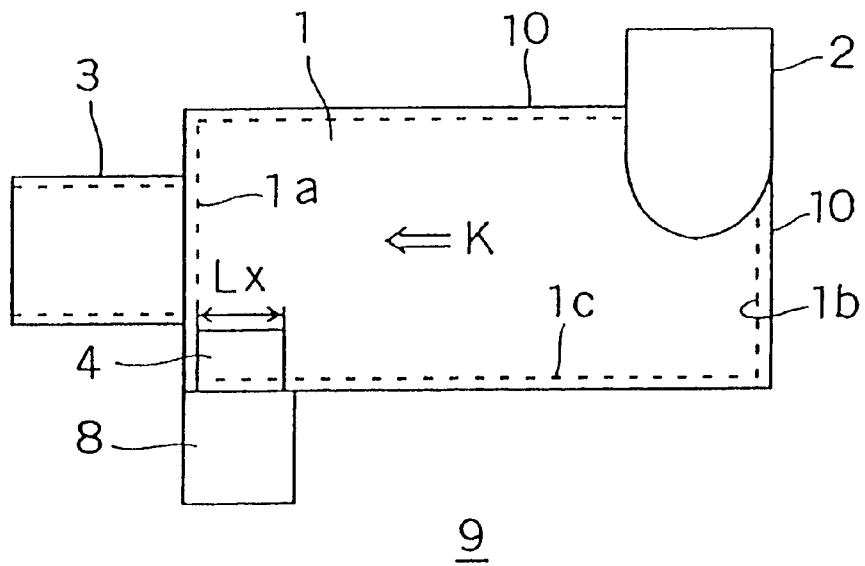

The results of the first and third experiments show that higher gas-liquid separation performance is achieved with a shorter distance Lm from the gas outlet 3 side end surface 1a of the fluid passage 1 to the end position of the liquid outlet 4, and with a shorter length Lx of the liquid outlet 4. The results of these experiments are reflected in the design of the vortex-stream gas-liquid separator 9 of an eleventh embodiment of the present invention, of which a perspective view and a front view are shown in FIGS. 17A and 17B. This vortex-stream gas-liquid separator 9 has a rectangular liquid outlet 4 so formed as to border the gas outlet 3 side end surface 1a of the fluid passage 1. Except for the liquid outlet 4, this vortex-stream gas-liquid separator 9 has the same geometry as the vortex-stream gas-liquid separator 9 of the first embodiment.

Figure 18A:
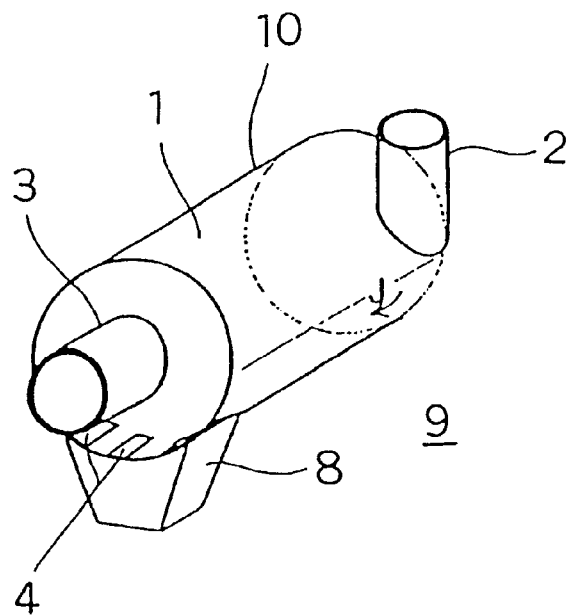
FIGS. 18A and 18B are a perspective view and a front view of the vortex-stream gas-liquid separator of a twelfth embodiment of the present invention.
Figure 18B:
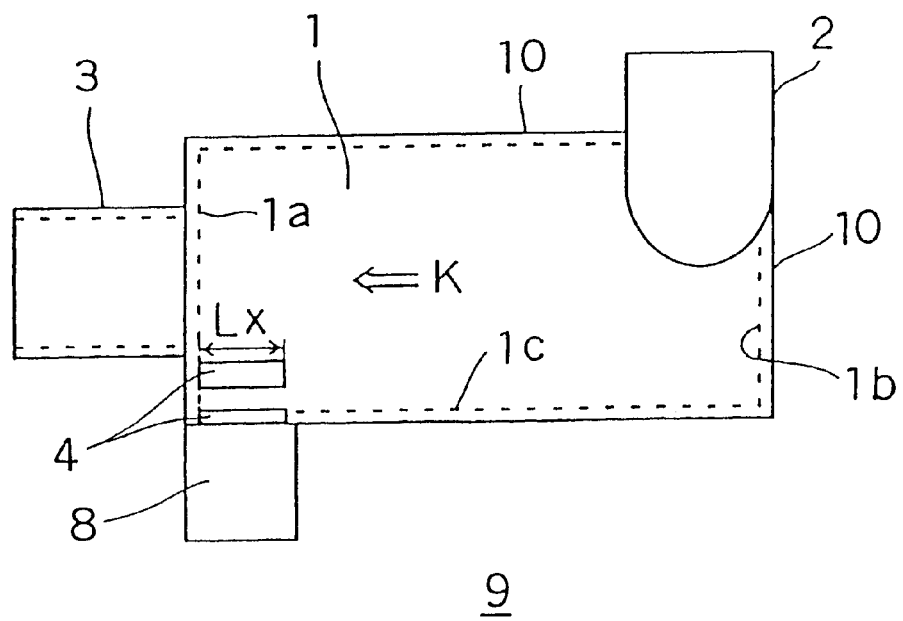
Figure 19A:
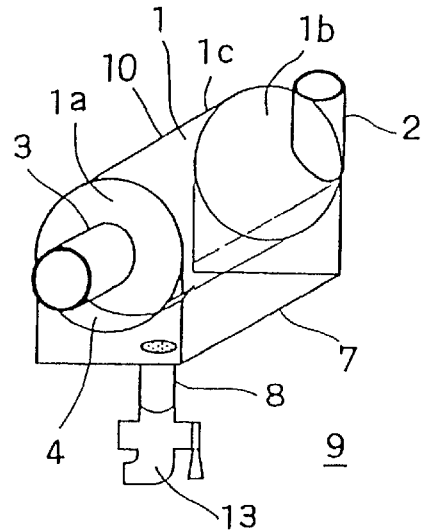
FIGS. 19A, 19B, and 19C are a perspective view, a front view, and a side view, respectively, of the vortex-stream gas-liquid separator of a thirteenth embodiment of the present invention.
Figure 19B:
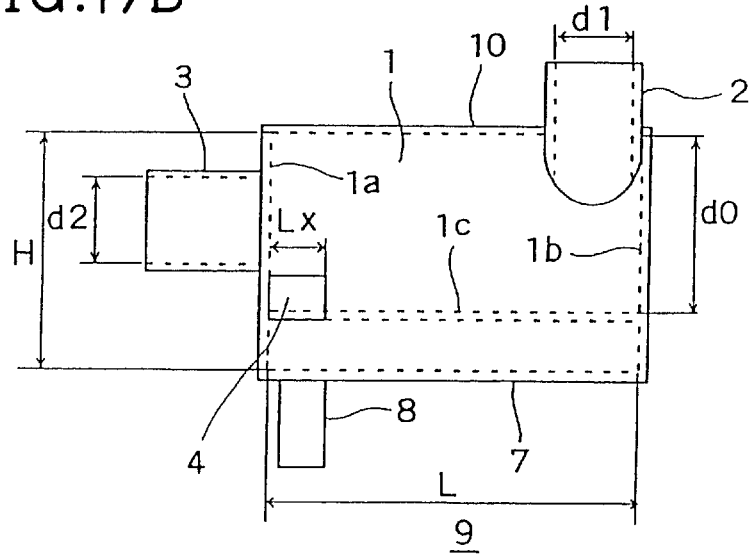
Figure 19C:
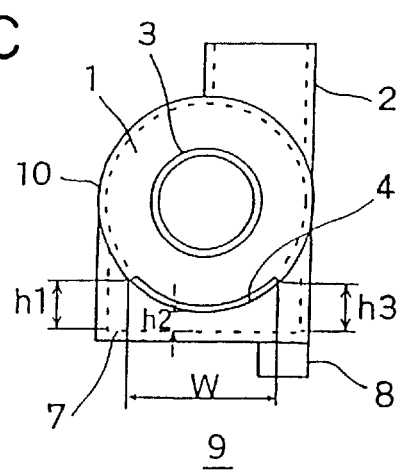

FIGS. 18A and 18B are a perspective view and a sectional view of the vortex-stream gas-liquid separator 9 of a twelfth embodiment of the present invention. This vortex-stream gas-liquid separator 9 differs from the vortex-stream gas-liquid separator 9 of the eleventh embodiment in that the liquid outlet 4 is so divided as to consist of three slits formed with their longer sides along the axis of the fluid passage 1. FIGS. 19A, 19B, and 19C are a perspective view, a sectional view, and a side view of the vortex-stream gas-liquid separator 9 of a thirteenth embodiment of the present invention. This vortex-stream gas-liquid separator 9 is similar to the vortex-stream gas-liquid separator 9 of the second embodiment provided with a liquid collection reservoir 7, and differs therefrom only in that it has a rectangular liquid outlet 4 so formed as to border the gas outlet 3 side end surface 1a of the fluid passage 1.

Next, another three experiments will be described that were conducted to study in more detail the influence of the liquid outlet 4 on the gas-liquid separation performance. These experiments, hereafter referred to as the seventh to ninth experiments, were conducted with the vortex-stream gas-liquid separator 9 of the thirteenth embodiment described above, but with different dimensions given thereto exactly as with the vortex-stream gas-liquid separators used in the first to sixth experiments by closing a part of the liquid outlet 4 in various ways with adhesive tape. The symbols representing those dimensions are shown in FIGS. 19B and 19C. Here, as the gas-liquid two-phase fluid was used air containing water droplets suspended therein. The width W of the liquid outlet 4 is 46 mm, and its length Lx along the axis is 20 mm from the gas outlet side end surface 1a. The distance from the liquid outlet 4 to the floor surface of the liquid collection reservoir 7 is h2=5 mm at the center, and is h1=h3=14.5 mm at both ends.

Figure 20:
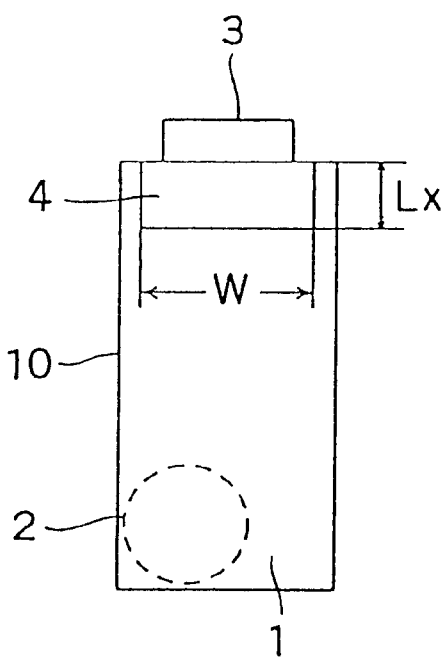
FIG. 20 is a plan view of the vortex-stream gas-liquid separator used in the seventh experiment.

The aim of the seventh experiment is to study the relationship between the length Lx of the liquid outlet 4 along the axis of the fluid passage 1 and the gas-liquid separation performance. Here, the flow rate of the gas-liquid two-phase fluid is 1.6 m³/min. FIG. 20 is a plan view of the vortex-stream gas-liquid separator 9 used in the seventh experiment. Here, the width W of the liquid outlet 4 is equal to 46 mm, and the valve 13 is left open so that the droplets of the liquid separated and collected in the liquid collection reservoir 7 are discharged quickly through the drain outlet 8.

Figure 21:
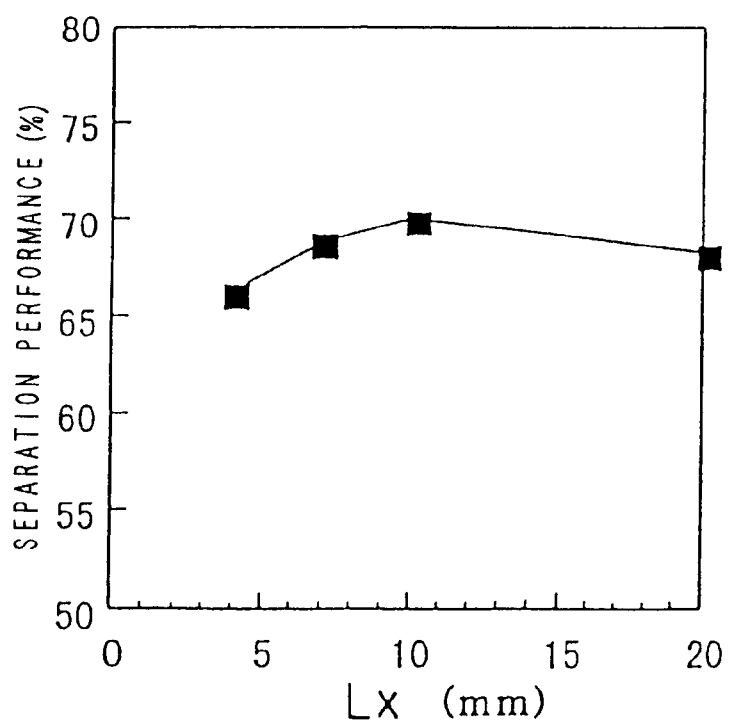
FIG. 21 is a diagram showing the results of the seventh experiment.
Figure 22A:
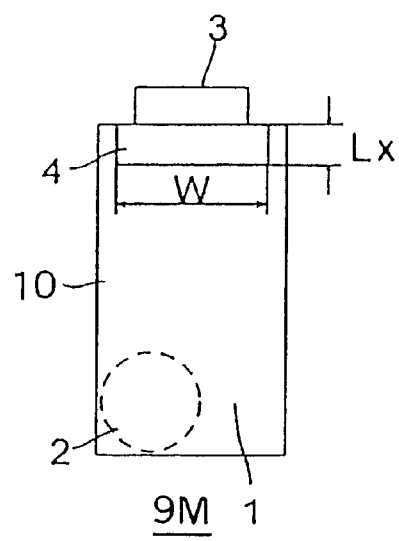
FIGS. 22A to 22E are plan views of the vortex-stream gas-liquid separators used in the eighth and ninth experiments.
Figure 22B:
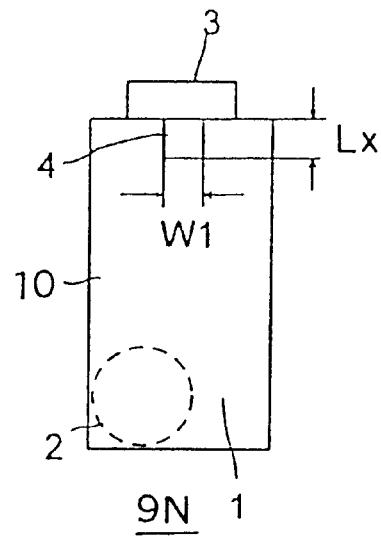
Figure 22C:
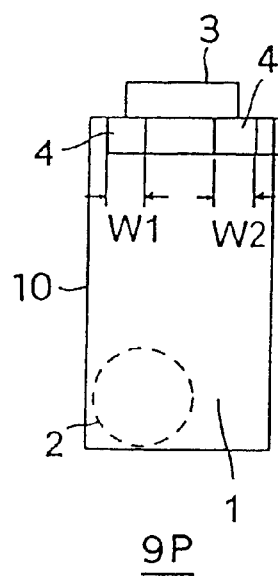
Figure 22D:
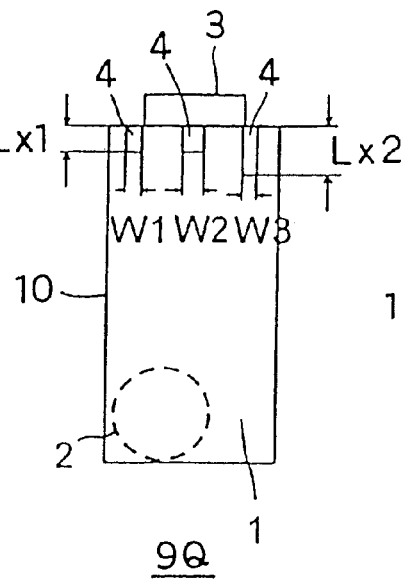
Figure 22E:
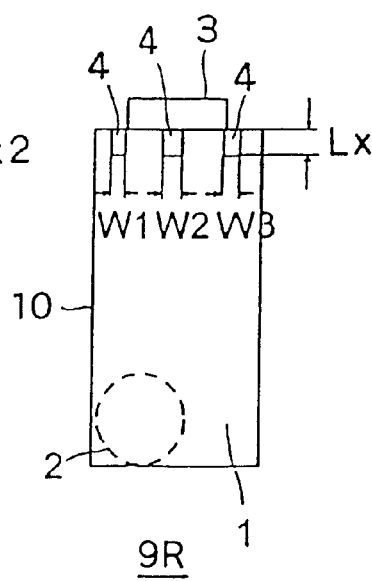

The results of the seventh experiment are shown in FIG. 21. In FIG. 21, the length Lx of the liquid outlet 4 along the axis of the fluid passage 1 is taken along the horizontal axis, and the gas-liquid separation performance, given as the ratio of the amount of separated liquid to the amount of liquid contained as droplets in the introduced gas-liquid two-phase fluid, is taken along the vertical axis. The gas-liquid separation performance increases from about 66% to about 69% and then to about 70% as the length Lx of the liquid outlet 4 increases from 4 mm to 7mm and then to 10 mm, but thereafter decreases to about 69% as the length Lx further increases to 20 mm. Thus, there exits an optimum value of the length Lx of the liquid outlet 4 around 10 mm that yields the maximum gas-liquid separation performance.

FIGS. 22A to 22E are plan views of the vortex-stream gas-liquid separators 9 used in the eighth and ninth experiments. Here, the following five types of vortex-stream gas-liquid separator are used: the one 9M shown in FIG. 22A with one liquid outlet 4 having a large width W, the one 9N shown in FIG. 22B with one liquid outlet 4 having a small width W1, the one 9P shown in FIG. 22C with two liquid outlets 4, the one 9Q shown in FIG. 22D with three liquid outlets 4 having different lengths Lx1 and Lx2, and the one 9R shown in FIG. 22E with three liquid outlets 4 having the same length Lx. In addition, as the vortex-stream gas-liquid separators 9M and 9P, versions with different lengths Lx, namely 9M-4, 9M-7, and 9M-10 and versions with different widths W1 and W2, namely 9P-13 and 9P-18 are used.

A full list of these vortex-stream gas-liquid separators is given below that shows the length and width (in mm) of their respective liquid outlet 4.

| | | |
|---|---|---|
| 9M-4: | Lx = 4, | W = 46 |
| 9M-7: | Lx = 7, | W = 46 |
| 9M-10: | Lx = 10, | W = 46 |
| 9N: | Lx = 10, | W1 = 10 |
| 9P-13: | Lx = 10, | W1 = W2 = 13 |
| 9P-18: | Lx = 10, | W1 = W2 = 18 |
| 9Q: | Lx1 = 10, Lx2 = 20, | W1 = W3 = 3, W2 = 6 |
| 9R: | Lx = 10, | W1 = W3 = 3, W2 = 6 |

The main aim of the eighth experiment is to study the relationship among the area of the liquid outlet 4, the number of divisions thereof, and the gas-liquid separation performance. Here, the valve 13 is left open so that the droplets of the liquid separated and collected in the liquid collection reservoir 7 are discharged quickly through the drain outlet 8, and the flow rate of the gas-liquid two-phase fluid is 1.6 m$^3$/min.

Figure 23:
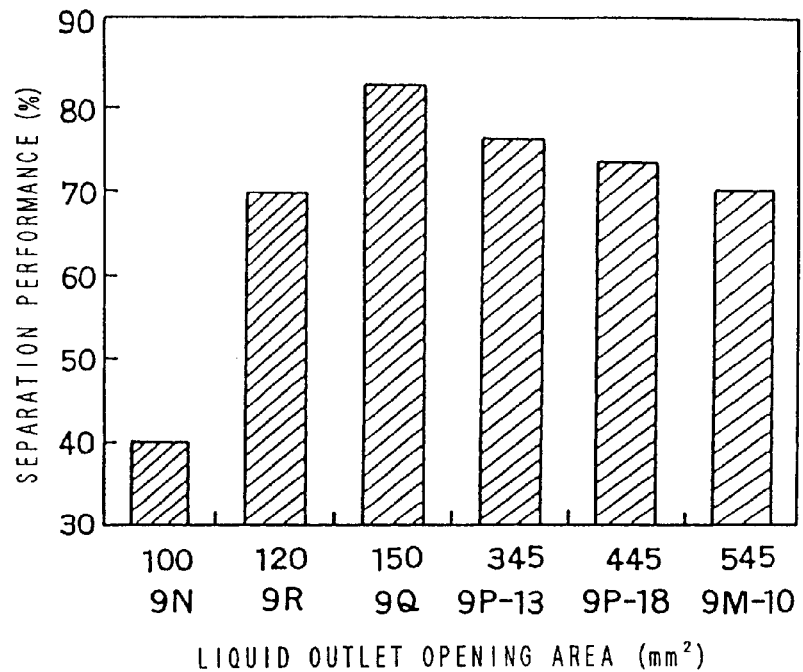
FIG. 23 is a diagram showing the results of the eighth experiment.

The results of the eighth experiment are shown in FIG. 23. In FIG. 23, different types of vortex-stream gas-liquid separators are lined up along the horizontal axis with indications of the total area of their respective liquid outlet 4, and the gas-liquid separation performance is taken along the vertical axis. Higher gas-liquid separation performance is achieved with types of vortex-stream gas-liquid separator like 9Q with a plurality of liquid outlets 4 each having a small opening area than with types of vortex-stream gas-liquid separator like 9M-10 with only one liquid outlet 4 having a large opening area. Moreover, with a total opening area of 120 mm$^2$ or more, it is possible to achieve separation performance higher than 70%.

The aim of the ninth experiment is to study the relationship between the distance from the liquid outlet 4 to the top surface of the liquid collected in the liquid collection reservoir 7 and the gas-liquid separation performance. To achieve this, the experiment was performed, on the one hand, with the vortex-stream gas-liquid separator 9 arranged with a 5° inclination such that its gas outlet 3 side is higher than its fluid inlet 2 side and, on the other hand, with the vortex-stream gas-liquid separator 9 arranged horizontally, with the drain outlet 8 closed in both cases. The 5° inclination causes more of the liquid collected in the liquid collection reservoir 7 to gather toward the fluid inlet 2 side. Here, the flow rate of the gas-liquid two-phase fluid is 1.6 m$^3$/min.

Figure 24:
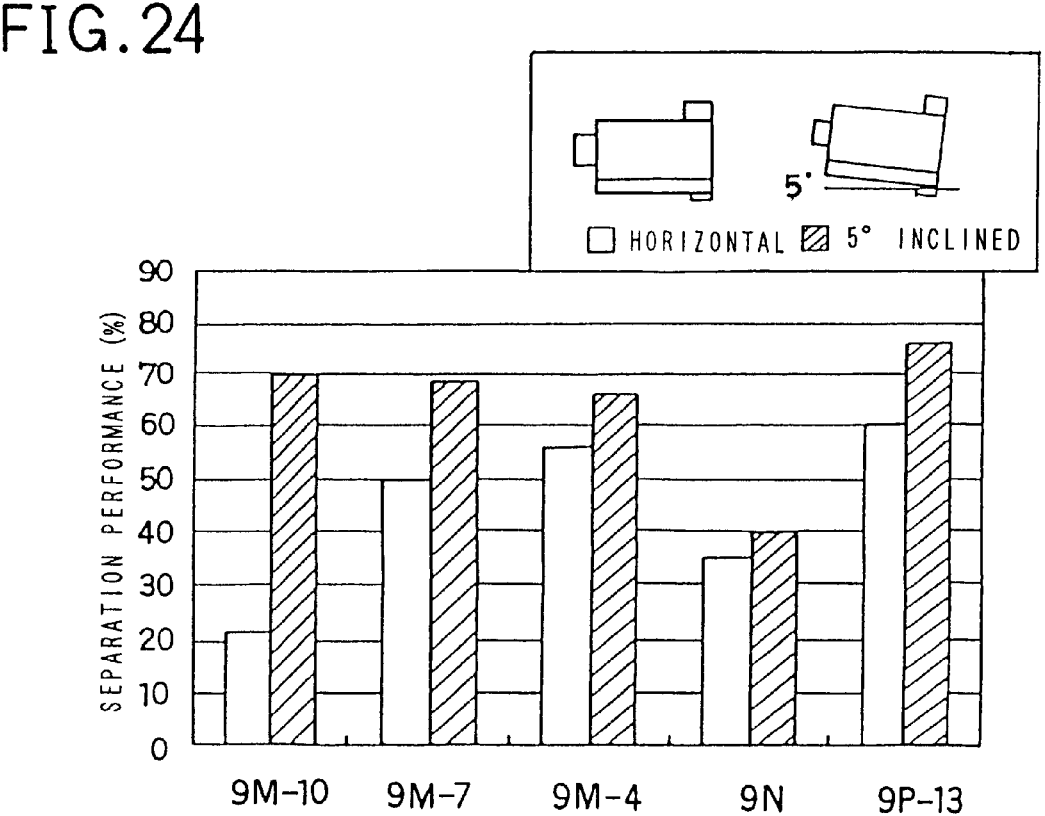
FIG. 24 is a diagram showing the results of the ninth experiment.

The results of the experiment are shown in FIG. 24. In all of the vortex-stream gas-liquid separators, higher gas-liquid separation performance is achieved when they are arranged with an inclination than when they are arranged horizontally. This is because, although all of the vortex-stream gas-liquid separators intrinsically have the ability to separate gas and liquid, they do not exhibits that ability when arranged horizontally.

When the vortex-stream gas-liquid separators are arranged horizontally, as the separated liquid is collected in the liquid collection reservoir 7, the surface of the liquid, which lies below the liquid outlet 4, rises, and thus the distance between the liquid outlet 4 and the surface of the liquid becomes shorter. Part of the gas passing through the fluid passage 1 flows through the liquid outlet 4 into the liquid collection reservoir 7, and therefore, when the distance between the liquid outlet 4 and the surface of the liquid becomes too short, the gas flown into the liquid collection reservoir 7 pulls up the liquid and carries droplets of the liquid to the gas outlet 3. This is considered to lower the separation performance.

Comparison between the vortex-stream gas-liquid separator 9M-10 in which the liquid outlet 4 is provided in the lowest portion of the fluid passage 1 and in which the distance from the liquid outlet 4 to the floor surface of the liquid collection reservoir 7 is 5 mm and the vortex-stream gas-liquid separator 9P-13 in which the liquid outlet 4 is provided not in the lowest portion of the fluid passage 1 but in a higher position and in which the distance from the liquid outlet 4 to the floor surface of the liquid collection reservoir 7 is 10 mm shows that the former exhibits a far greater difference in separation performance between when arranged with an inclination and when arranged horizontally. This indicates that, the longer the distance from the liquid outlet 4 to the surface of the liquid collected in the liquid collection reservoir 7, the higher the separation performance. Although the distance from the liquid outlet 4 to the surface of the liquid when a given amount of liquid has been collected depends on the shape and dimensions of the liquid collection reservoir 7, it can be said that satisfactorily high separation performance is achieved by keeping the distance from the liquid outlet 4 to the surface of the liquid 10 mm or longer at all times.

An inclination of about 5° of the vortex-stream gas-liquid separator has little effect on the gas-liquid two-phase fluid passing through the fluid passage 1. This will be clear from the fact that there is no difference between the results of this experiment conducted with the vortex-stream gas-liquid separator 9M-10 arranged with an inclination and the results of the eighth experiment conducted with the same gas-liquid separator arranged horizontally. It is to be understood that this experiment was conducted merely to study the relationship between the distance from the liquid outlet 4 to the surface of the liquid and the gas-liquid separation performance; that is, this experiment is not meant to encourage arranging the vortex-stream gas-liquid separator with an inclination. As long as the surface of the liquid is kept sufficiently far away, preferably 10 mm or more, from the liquid outlet 4, the vortex-stream gas-liquid separators 9 of the present invention offers satisfactorily high separation performance even when arranged horizontally.

Next, another three experiments will be described that were conducted to study the influence of the liquid outlet 4 and the flow rate of the gas-liquid two-phase fluid on the gas-liquid separation performance. These experiments, hereafter referred to as the tenth to twelfth experiments, were conducted with the same vortex-stream gas-liquid separators 9 as used in the seventh to ninth experiments described above, or with modified versions thereof with differently sized liquid outlets 4.

The aim of the tenth experiment is to study the relationship among the length Lx of the liquid outlet 4 along the axis of the fluid passage 1, the flow rate of the gas-liquid two-phase fluid, and the gas-liquid separation performance. Here, the length Lx of the liquid outlet 4 has a wider range, specifically from 0 to 50 mm, than in the seventh experiment. Moreover, since it is clear from the eighth experiment that the separation performance greatly lowers when the total opening area of the liquid outlet 4 becomes less than 100 mm$^2$, the total opening area of the liquid outlet 4 is here kept 100 mm$^2$ or more.

The flow rates of the gas-liquid two-phase fluid used here are 1.0 m$^3$/min, 1.42 m$^3$/min, and 1.61 m$^3$/min. The average flow velocities of the gas-liquid two-phase fluid inside the fluid passage 1 corresponding to those flow rates are 7.0 m/sec, 10.0 m/sec, and 11.3 m/sec. The valve 13 is left open so that the liquid droplet separated and collected in the liquid collection reservoir 7 are discharged quickly through the drain outlet 8.

Figure 25:
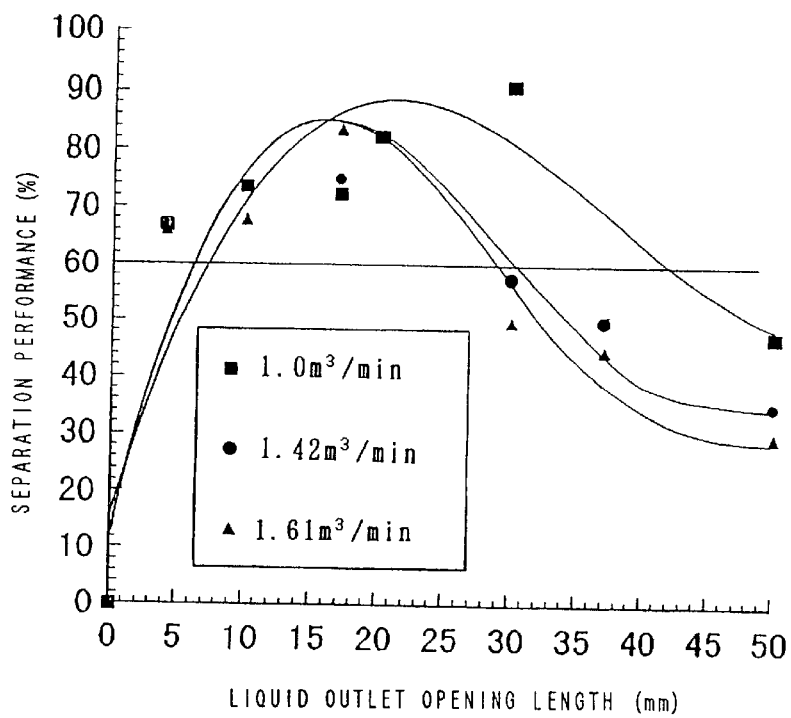
FIG. 25 is a diagram showing the results of the tenth experiment.

The results of the tenth experiment are shown in FIG. 25. The lower the flow rate of the gas-liquid two-phase fluid, and thus the lower the flow velocity thereof, the higher the gas-liquid separation performance. The range of the length Lx of the liquid outlet 4 that yields separation performance of 60% or higher roughly coincides between at the flow rate of 1.42 m$^3$/min and at the flow rate of 1.61 m$^3$/min, specifically from about 6 to 30 mm. At the minimum flow rate of 1.0 m$^3$/min, the range of the length Lx that yields separation performance of 60% or higher is from about 8 to 42 mm. At any of these flow rates, there exists an optimum value of the length Lx of the liquid outlet 4 in a range from 15 to 25 mm that yields the maximum separation performance.

Thus, it is desirable to give the liquid outlet 4 of the vortex-stream gas-liquid separator 9 a length Lx within this range. However, considering that the actual flow rate depends on how the gas-liquid separator is used and that it also varies during use under the influence of ambient conditions, it is preferable to determine the length Lx within a range from 8 to 30 mm that yields separation performance of 60% or higher at any of the three flow rates mentioned above.

The aim of the eleventh experiment is to study the relationship among the total opening area of the liquid outlet 4, the flow rate of the gas-liquid two-phase fluid, and the gas-liquid separation performance. The total opening area of the liquid outlet 4 is varied in a range from 60 to 240 mm$^2$, and the flow rates used here are, as in the tenth experiments, 1.0 m$^3$/min, 1.42 m$^3$/min, and 1.61 m$^3$/min. The valve 13 is left open so that the liquid droplet separated and collected in the liquid collection reservoir 7 are discharged quickly through the drain outlet 8.

Figure 26:
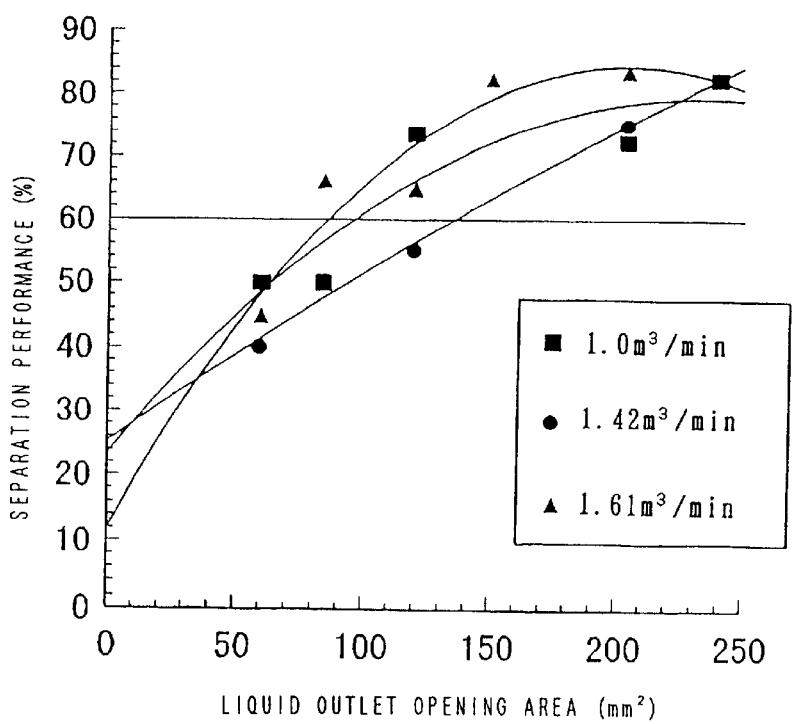
FIG. 26 is a diagram showing the results of the eleventh experiment.

The results of the eleventh experiment are shown in FIG. 26. Here, the gas-liquid separation performance varies with the flow rate, but in such a way that the gas-liquid separation performance is lowest at the medium flow rate of 1.42 m$^3$/min, and thus it is not possible to find a clear relationship between the flow rate and the gas-liquid separation performance. However, within the range in which the experiment was conducted, at any of the flow rates, the larger the total opening area of the liquid outlet 4, the higher the gas-liquid separation performance. To achieve separation performance of 60% or higher, it is necessary to give the liquid outlet 4 a total opening area of at least 100 mm$^2$, and, considering the variation of the flow rate, it is preferable to give the liquid outlet 4 a total opening area of 140 mm$^2$ or more.

The aim of the twelfth experiment is to study the relationship among the distance from the liquid outlet 4 to the top surface of the liquid collected in the liquid collection reservoir 7, the flow rate of the gas-liquid two-phase fluid, and the gas-liquid separation performance. The experiment was conducted with the valve 13 closed with the liquid collection reservoir 7 filled with water to a predetermined depth, and with the vortex-stream gas-liquid separator arranged horizontally. Here, the initial distances from the liquid outlet 4 to the surface of the liquid are 5 mm, 7 mm, and 10 mm, and the flow rates of the gas-liquid two-phase fluid are 1.0 m$^3$/min and 1.42 m$^3$/min.

Figure 27:
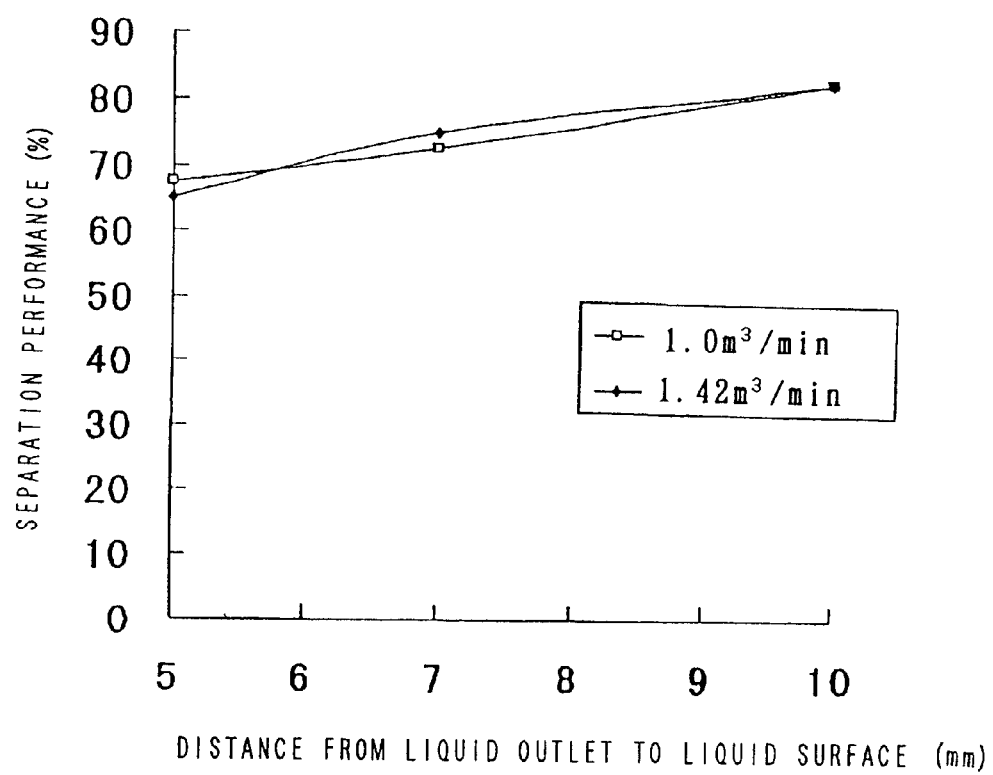
FIG. 27 is a diagram showing the results of the twelfth experiment.

The results of the twelfth experiment are shown in FIG. 27. There is almost no difference in gas-liquid separation performance between at the flow rate of 1.0 m$^3$/min and at the flow rate of 1.42 m$^3$/min. In either case, the separation performance achieved is about 67% when the distance from the liquid outlet 4 to the liquid surface is initially 5 mm and about 83% when the distance from the liquid outlet 4 to the liquid surface is initially 10 mm, i.e. when the liquid collection reservoir 7 is initially empty. For comparison, the same experiment was conducted with the liquid collection reservoir 7 initially empty and with the valve 13 left open so that no part of the liquid flown into the liquid collection reservoir 7 remains there. Also in this case, the gas-liquid separation performance achieved is about 83%.

The results of this experiment, like those of the ninth experiment, indicate that the maximum separation performance is achieved by keeping the distance from the liquid outlet 4 to the surface of the liquid collected in the liquid collection reservoir 7 10 mm or longer. Accordingly, in a vortex-stream gas-liquid separator 9 provided with a liquid collection reservoir 7, it is preferable to locate the floor surface of the liquid collection reservoir 7 10 mm or more away from the liquid outlet 4 and discharge the liquid collected in the liquid collection reservoir 7 before its surface comes much closer than 10 mm to the liquid outlet 4.

Figure 28A:
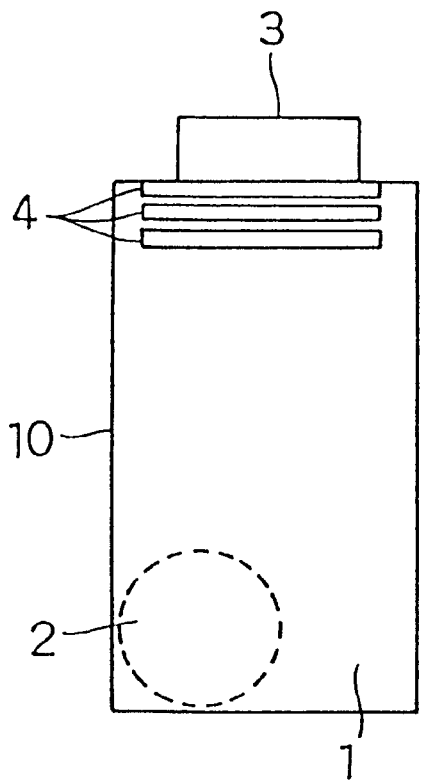
FIGS. 28A to 28D are plan views of the vortex-stream gas-liquid separators of a fourteenth to a seventeenth embodiment, respectively, of the present invention.
Figure 28B:
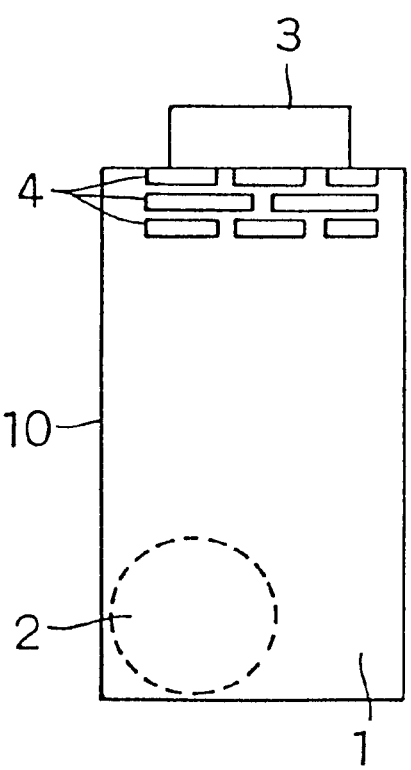
Figure 28C:
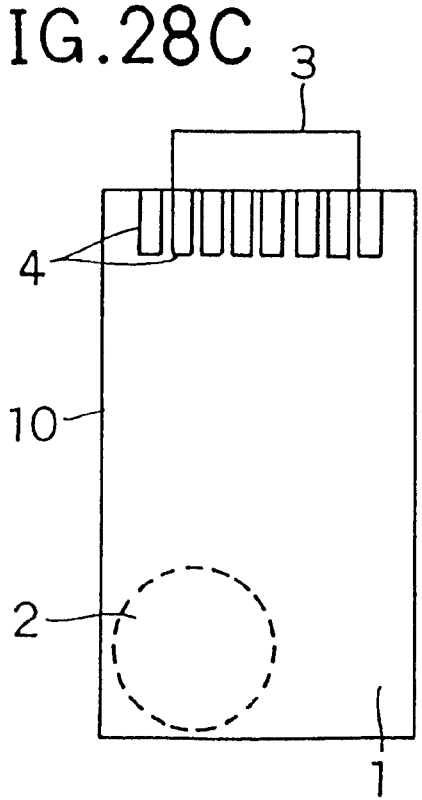
Figure 28D:
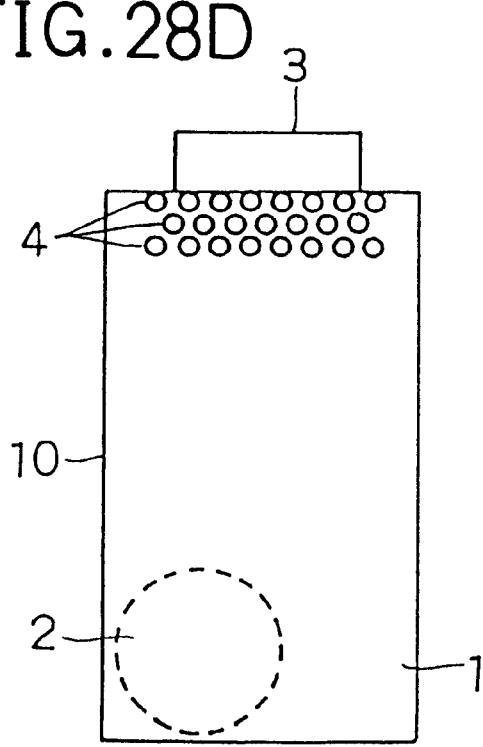

Now, the vortex-stream gas-liquid separators 9 of a fourteenth to a seventeenth embodiment of the present invention, having their liquid outlet 4 designed based on the results of the experiments described above, will be described with reference to FIGS. 28A to 28D, which are their respective plan views. In FIG. 28A, a plurality of long strip-like liquid outlets 4 having identical widths are formed so as to extend in the direction of the width of the fluid passage 1. In FIG. 28B, the liquid outlets 4 shown in FIG. 28A are each divided into shorter strip-like liquid outlets. In FIG. 28C, a plurality of short strip-like liquid outlets 4 having identical lengths are formed so as to extend in the direction of the axis of the fluid passage 1. In FIG. 28D, a plurality of small circular liquid outlets 4 are formed.

In all of these vortex-stream gas-liquid separators 9, the length along the axis of the area occupied by all the liquid outlets 4 is in a range from 8 to 30 mm, and the total opening area of the liquid outlets 4 is 140 mm$^2$ or more. Here, the length of each of the liquid outlets 4 along the axis may be 8 mm or less.

Figure 29A:
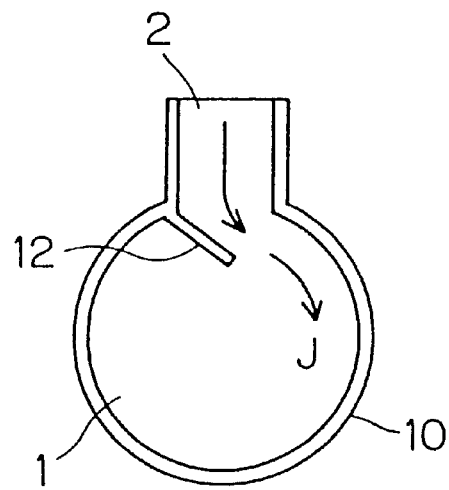
FIGS. 29A to 29D are sectional views of the vortex-stream gas-liquid separators of an eighteenth to a twenty-first embodiment, respectively, of the present invention.
Figure 29B:
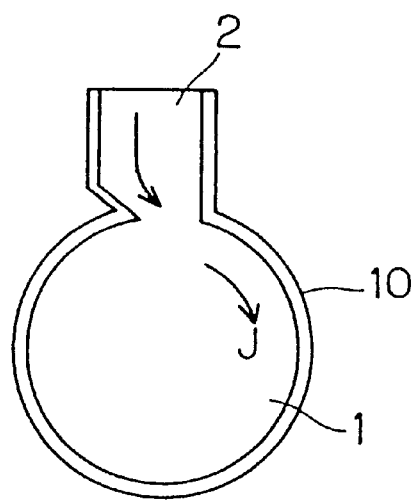

In any of the embodiments described heretofore, to permit the gas-liquid two-phase fluid to whirl circularly inside the fluid passage 1, the fluid inlet 2 is so formed as to have an internal diameter half as large as the diameter of the fluid passage 1 and extend along a line tangential to the fluid passage 1. However, alternatively, it is also possible to form the fluid inlet 2 otherwise. For example, it is also possible, as in an eighteenth embodiment of the present invention shown in FIG. 29A, to provide a guide member 12 inside the fluid passage 1. It is also possible, as in a nineteenth embodiment of the present invention shown in FIG. 29B, to form the fluid inlet 2 into a shape that causes the gas-liquid two-phase fluid to change its direction so as to flow along a line tangential to the fluid passage 1 immediately before entering it.

Figure 29C:
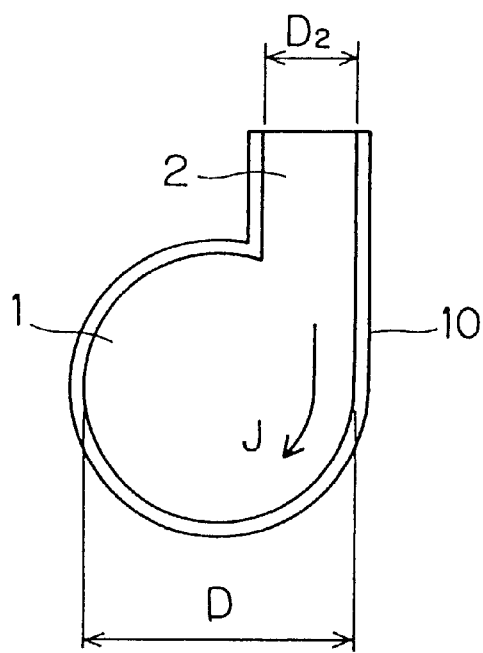

It is also possible, as in a twentieth embodiment of the present invention shown in FIG. 29C, to form a fluid inlet 2 along a line tangential to the fluid passage 1 in such a way that the fluid inlet 2 has a width, as measured in the direction of a radius of the fluid passage 1, smaller than half the diameter of the fluid passage 1. This helps reduce the proportion of the introduced gas-liquid two-phase fluid that becomes a component that whirls in the direction opposite to the direction indicated by an arrow J.

Figure 29D:
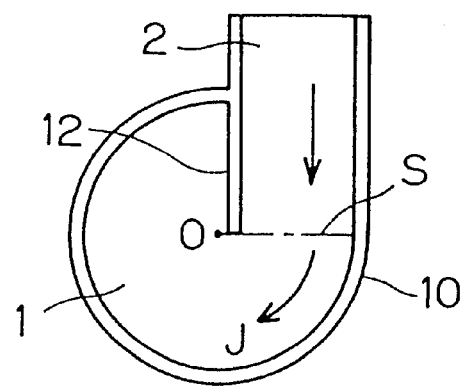

It is also possible, as in a twenty-first embodiment of the present invention shown in FIG. 29D, to provide a guide member that is so shaped as if being an extension of the fluid inlet 2 that reaches into the fluid passage 1. In this case, it is preferable that the guide member 12 be so formed as to reach a plane S perpendicular to the flow direction of the fluid and including the center axis of the fluid passage 1, because this helps further reduce the component that whirls in the opposite direction.

Figure 30A:
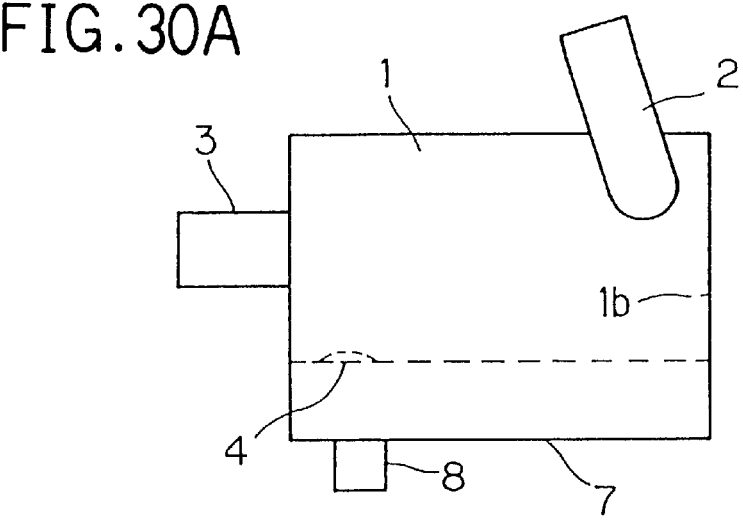
FIGS. 30A and 30B are front views of the vortex-stream gas-liquid separators of a twenty-second and a twenty-third embodiment, respectively, of the present invention.
Figure 30B:
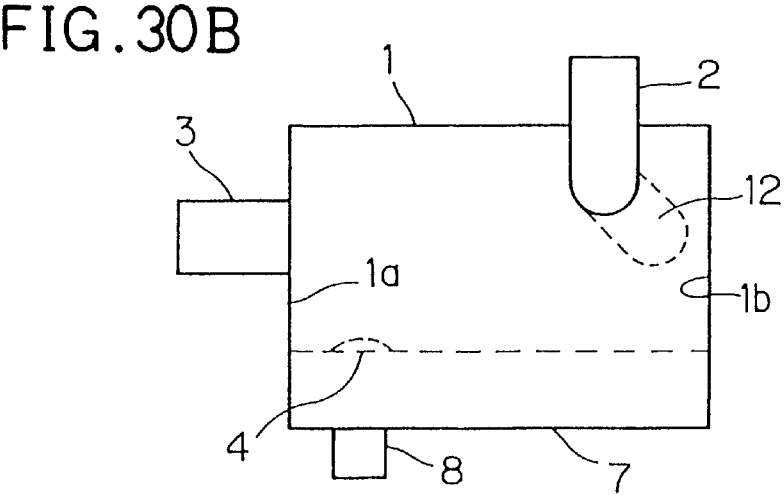

Moreover, it is also possible, as in a twenty-second embodiment of the present invention shown in FIG. 30A, to incline the fluid inlet 2 toward the fluid inlet side end surface 1b of the fluid passage 1, or, as in a twenty-third embodiment of the present invention shown in FIG. 30B, to bend the guide member 12 toward the fluid inlet side end surface 1b of the fluid passage 1, in order to direct the gas-liquid two-phase fluid introduced through the fluid inlet 2 toward the fluid inlet side end surface 1b of the fluid passage 1. This permits the gas-liquid two-phase fluid to collide with the end surface 1b, and thereby permits more droplets of the liquid to be condensed on the inner wall of the casing 10.

Figure 31:
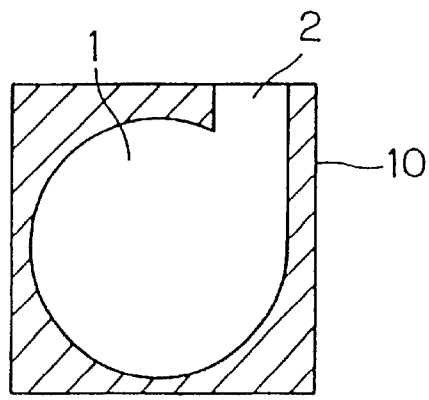
FIG. 31 is a sectional view of the vortex-stream gas-liquid separator of a twenty-fourth embodiment of the present invention.

As long as the fluid passage 1 is substantially columnar, the casing 10 does not necessarily have to be made cylindrical. For example, the casing 10 may be so formed as to have a rectangular section as in a twenty-fourth embodiment of the present invention shown in FIG. 31, or any other shape. In such cases, the fluid inlet 2 is formed not as a pipe but as a bore.

Figure 32A:
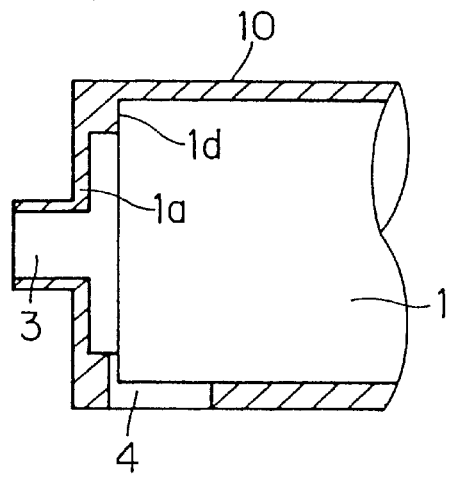
FIGS. 32A to 32E are sectional views of the vortex-stream gas-liquid separators of a twenty-fifth to a twenty-ninth embodiment, respectively, of the present invention.
Figure 32B:
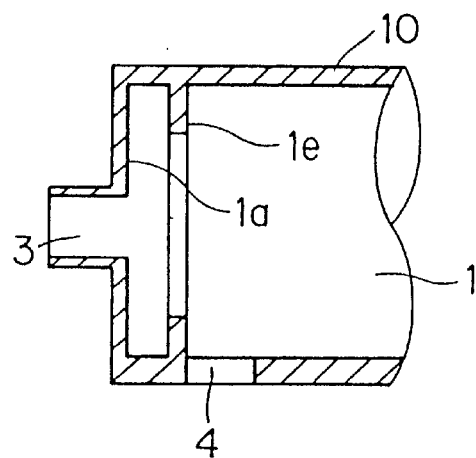

It is possible to achieve still higher gas-liquid separation performance by providing a damming means on the inner wall of the casing 10 for stopping the flow of the condensed droplets of the liquid. The vortex-stream gas-liquid separators of a twenty-fifth to a twenty-ninth embodiment of the present invention, having a damming means, will be described below with reference to FIGS. 32A to 32E, which are their respective sectional views. In the twenty-fifth embodiment shown in FIG. 32A, a bank-like portion id is formed inside the casing 10 so as to overlap the liquid outlet 4. In the twenty-sixth embodiment shown in FIG. 32B, a ring-shaped projection is formed inside the casing 10 so as to overlap the liquid outlet 4, and thereby a bank-like portion 1e is formed. In these structures, the liquid droplets flowing along the inner wall of the casing 10 collide with the bank-like portion 1d or 1e and are thereby guided to the liquid outlet 4.

Figure 32C:
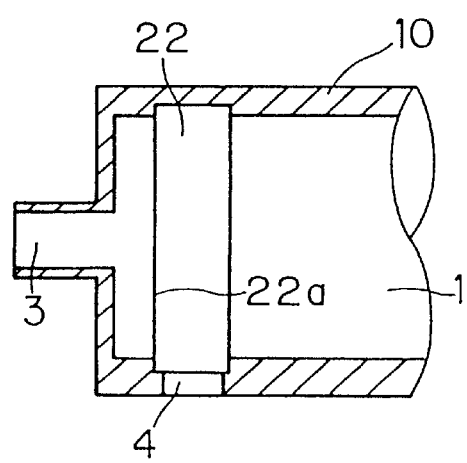
Figure 32D:
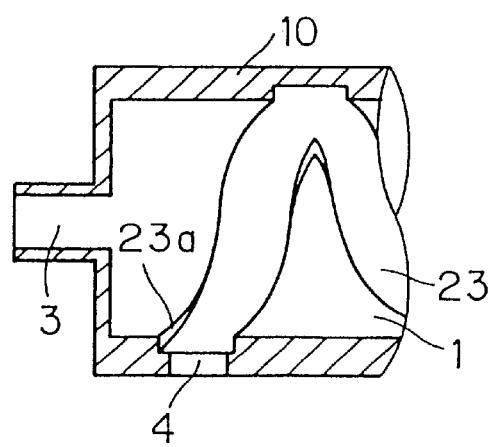

In the twenty-seventh embodiment shown in FIG. 32C, a groove 22 is formed in the inner wall of the casing 10 so as to overlap the liquid outlet 4, and thereby a bank-like portion 22a is formed on the gas outlet 3 side of the liquid outlet 4. In the twenty-eighth embodiment shown in FIG. 32D, a spiral groove 23 is formed in the inner wall of the casing 10 so as to overlap the liquid outlet 4, and thereby a bank-like portion 23a is formed. In these structures, the liquid droplets contained in the gas-liquid two-phase fluid collide with the bank-like portion 22a or 23a and are thereby guided to the liquid outlet 4.

Figure 32E:
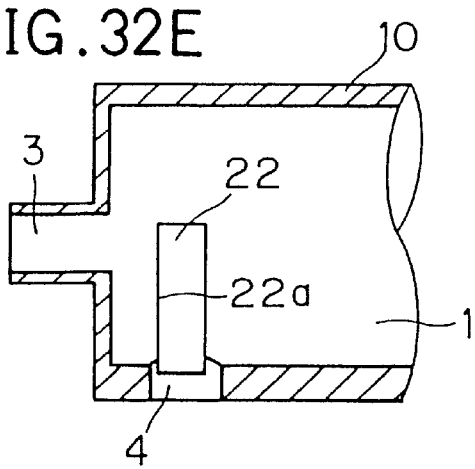

Instead of forming a bank-like portion all around the fluid passage 1, it is also possible, as in the twenty-ninth embodiment shown in FIG. 32E, to form a bank-like portion 22a only in a portion of the fluid passage 1 that overlaps the liquid outlet 4. Such a damming means as described above does not necessarily have to be formed so as to overlap the liquid outlet 4; it serves its purpose as long as it is located in the vicinity of the liquid outlet 4. Moreover, a bank-like portion may be composed of a single projection or groove, or of any greater number of projections or grooves.

Figure 33A:
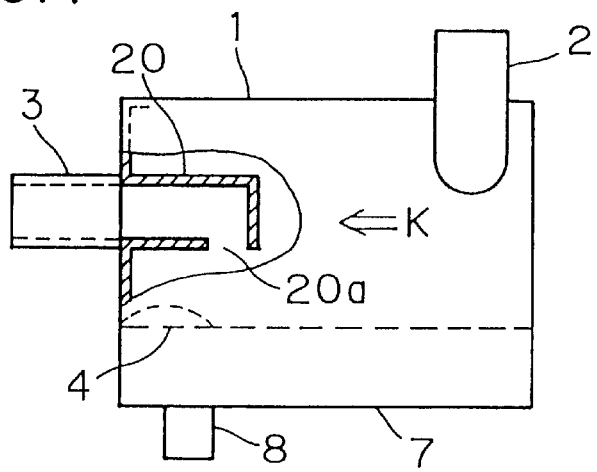
FIGS. 33A, 33B, and 33C are front views of the vortex-stream gas-liquid separators of a thirtieth, a thirty-first, and a thirty-second embodiment, respectively, of the present invention.
Figure 33B:
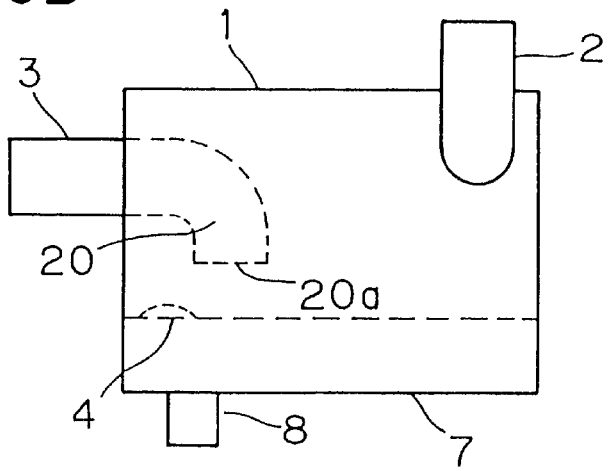
Figure 33C:
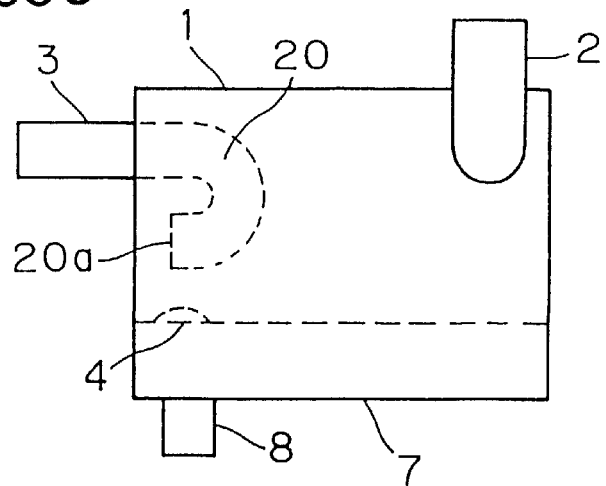
Figure 34:
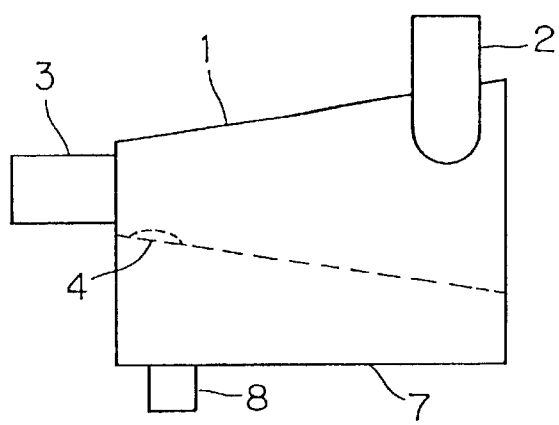
FIG. 34 is a front view of the vortex-stream gas-liquid separator of a thirty-third embodiment of the present invention.

In cases where a discharge pipe 20 that protrudes into the fluid passage 1 is provided, the discharge pipe 20 may be so formed as to have its opening 20a in a direction other than the direction in which the fluid advances (indicated by an arrow K). The vortex-stream gas-liquid separators of a thirtieth to a thirty-second embodiment of the present invention, having a discharge pipe 20, are shown in FIGS. 33A to 33C, which are their respective sectional views. In these structures, the gas-liquid two-phase fluid is forced to change its flow direction when entering the discharge pipe 20, and this quite conveniently permits more liquid droplets to be separated as a result of not being able to follow the flow of the gas.

In the thirtieth embodiment shown in FIG. 33A, the discharge pipe 20 is closed at its end, and has an opening 20a in a lower portion thereof. In the thirty-first embodiment shown in FIG. 33B, the discharge pipe 20 is bent downward. In the thirty-second embodiment shown in FIG. 33C, the discharge pipe 20 is bent toward the gas outlet 3 side end surface 1a of the fluid passage 1.

As described previously, the fluid passage 1 has only to be substantially columnar; that is, it does not necessarily have to be strictly columnar. The vortex-stream gas-liquid separators of a thirty-third to a thirty-fifth embodiment of the present invention, having the shape of their fluid passage 1 somewhat modified from a columnar shape, are shown in FIGS. 34, 35A and 35B, and 36A and 36B. In the thirty-third embodiment shown in FIG. 34, the fluid passage 1 has the shape of a truncated cone that decreases in diameter toward the liquid outlet 3. In this structure, as the fluid advances, its diameter decreases, and thus their rotational speed increases. This helps increase the energy with which the fluid collides with the inner wall of the casing 10, and thus helps keep high collision energy up to the end of the fluid passage 1.

Figure 35A:
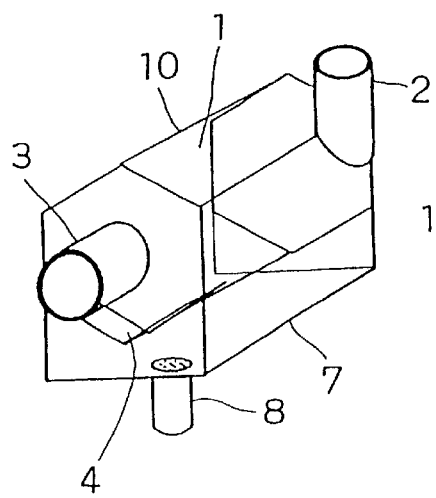
FIGS. 35A and 35B are a perspective view and a side view, respectively, of the vortex-stream gas-liquid separator of a thirty-fourth embodiment of the present invention.
Figure 35B:
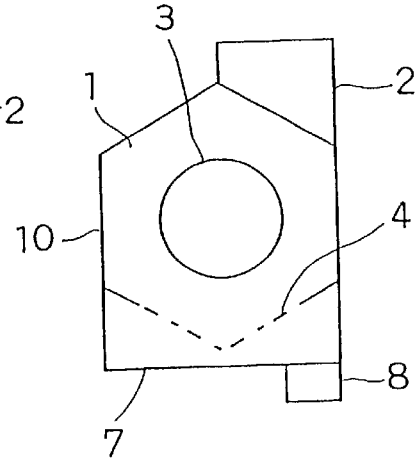
Figure 36A:
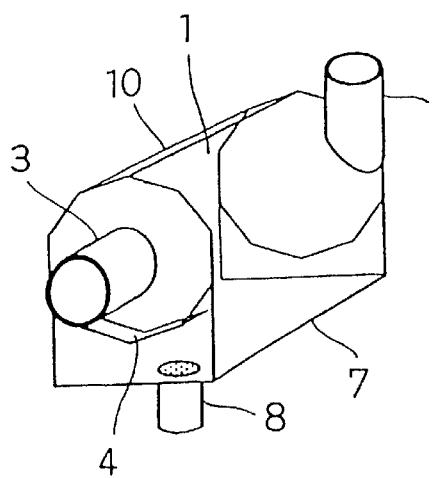
FIGS. 36A and 36B are a perspective view and a side view, respectively, of the vortex-stream gas-liquid separator of a thirty-fifth embodiment of the present invention.
Figure 36B:
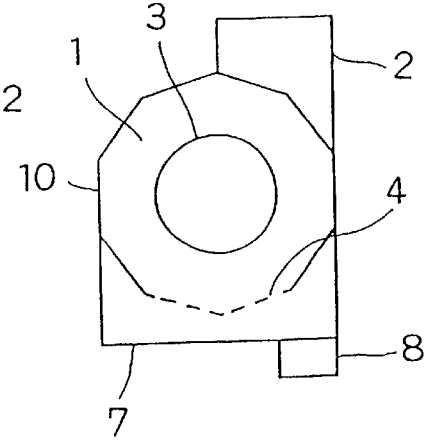

In the thirty-fourth embodiment shown in FIGS. 35A and 35B, and in the thirty-fifth embodiment shown in FIGS. 36A and 36B, the casing 10 has the shape of a polygonal prism, and the fluid passage 1 has, in its cross section, the shape of a regular hexagon or regular decagon, respectively. Here, the fluid passage 1 is defined by flat surfaces, and this makes it easy for the circularly whirling gas-liquid two-phase fluid to collide with the wall surface, and thereby prompts the separation of liquid droplets. In addition, this helps reduce the kinetic energy of the gas-liquid two-phase fluid, and thereby makes the collection of liquid droplets easy.

The casing 10 is arranged with one of the ridges between adjacent faces located at the bottom, so that the corner along this ridge constitutes the lowest portion of the fluid passage 1. This corner constituting the lowest portion of the fluid passage 1 is connected to the liquid outlet 4, and serves to guide smoothly to the liquid outlet 4 the liquid droplets that have been condensed on the inner wall of the casing 10 and then flown downward into the corner.

Giving the fluid passage 1 a triangular or quadrangular cross section increases pressure loss, and also causes disturbance in the stream of the gas-liquid two-phase fluid. However, by giving the fluid passage 1 a cross section closer to a circle by forming it into the shape of a hexagon or other polygon having six or more sides, it is possible to minimize the pressure loss and stream disturbance, and simultaneously reduce the kinetic energy appropriately in such a way as to increase the efficiency of liquid droplet collection. However, giving the fluid passage 1 a cross section too close to a circle makes it impossible to obtain the effects of giving it a polygonal cross section. Thus, it is preferable that the fluid passage 1 be given a cross section shaped like a polygon having about 20 sides or less, more preferably between an octagon and a dodecagon. How many sides to give actually to the cross section of the fluid passage 1 is determined also in consideration of how difficult it is to produce a casing 10 having such a cross section.

Figure 37:
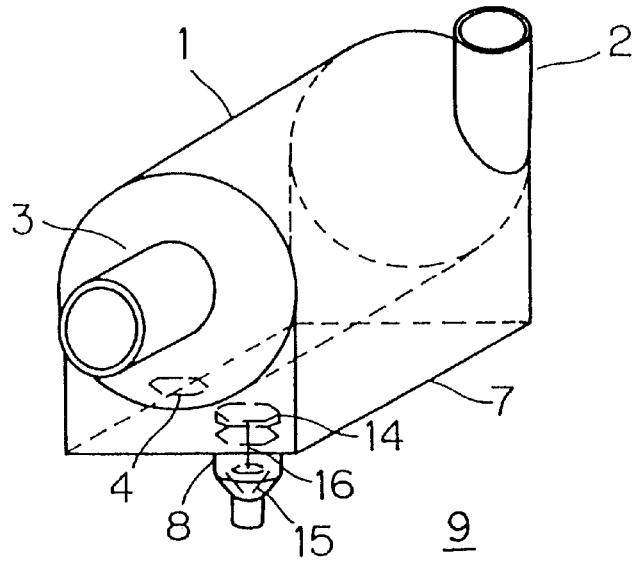
FIG. 37 is a perspective view of the vortex-stream gas-liquid separator of a thirty-sixth embodiment of the present invention.

FIG. 37 is a perspective view of the vortex-stream gas-liquid separator 9 of a thirty-sixth embodiment of the present invention. This vortex-stream gas-liquid separator 9 is provided with a valve 15 at the drain outlet 8, and is provided with a float 14 inside the liquid collection reservoir 7. The valve 15 and the float 14 are coupled together so that the opening and closing of the drain outlet 8 by the valve 15 is controlled by the upward and downward movement of the float 14. When the surface of the liquid collected in the liquid collection reservoir 7 reaches a predetermined level, the float floats on the liquid. As a result, the drain outlet 8, which has thus far been closed by the valve 15, is opened, and thus the liquid is discharged. Here, the float 14 is so designed as to start floating when the liquid surface level dropped down to a predetermined level that is 10 mm or more away from the liquid outlet 4. This helps prevent the gas-liquid two-phase fluid from readily containing the already collected liquid again when there is a large amount of liquid collected in the liquid collection reservoir 7.

In any of the vortex-stream gas-liquid separators 9 of the embodiments described heretofore, it is preferable to give resilience to the inner wall of the casing 10. If the wall surface is hard, it permits the liquid droplets that have collided therewith to splash around in such a way as to be readily contained back in the gas-liquid two-phase fluid. Such splashing of liquid droplets can be prevented by giving resilience to the wall surface, and this thus helps further enhance the gas-liquid separation performance. Giving resilience to the wall surface only in a portion thereof near the fluid inlet 2, where the flow velocity of the gas-liquid two-phase fluid is high, is sufficiently effective. A casing 10 having resilience on its inner wall is produced by forming the casing 10 itself out of a material having resilience; alternatively, it may be produced by laying a film-shaped resilient material with a flat surface or with a surface having fine irregularities formed thereon over the inner surface of a casing 10 made of a hard material, or in any other manner.

Moreover, in any of the vortex-stream gas-liquid separators 9 of the embodiments described heretofore, the fluid inlet 2 is arranged vertically so that the gas-liquid two-phase fluid is introduced into the fluid passage from above. However, the fluid inlet 2 may be arranged horizontally so that the gas-liquid two-phase fluid is introduced into the fluid passage from the side.

Figure 38:
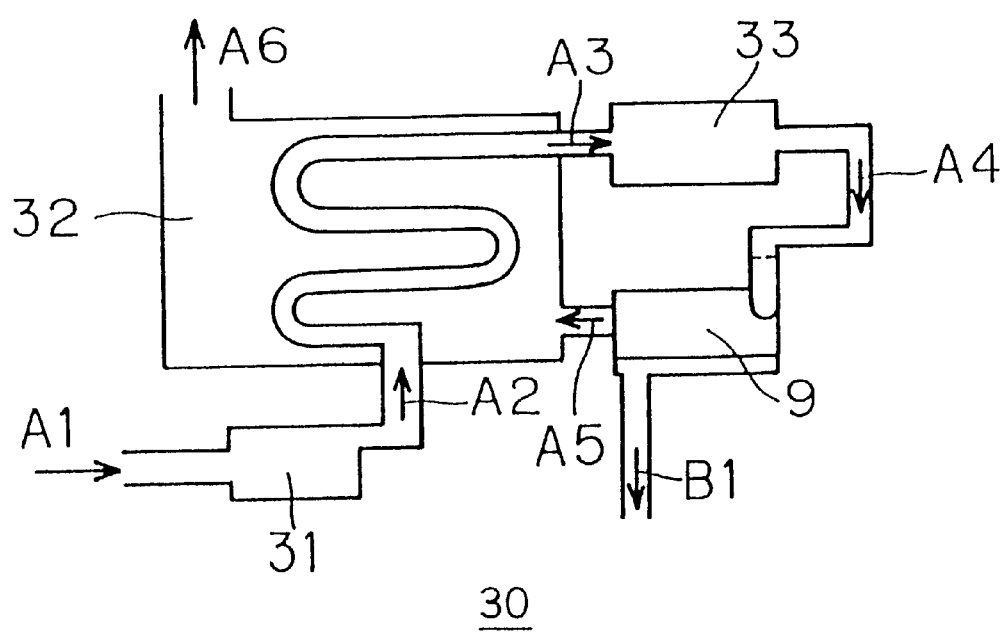
FIG. 38 is a block diagram of a gas-liquid separation system embodying the present invention.

Next, a gas-liquid separation system 30 embodying the present invention will be described with reference to FIG. 38. FIG. 38 is a diagram schematically showing the structure of a gas-liquid separation system 30 that is provided with the vortex-stream gas-liquid separator 9 of one of the embodiments described above. This gas-liquid separation system 30 is used, for example, in a clothes dryer.

High-temperature, high-humidity air A1 introduced into the gas-liquid separation system 30 is compressed by a compressor 31, and is thereby converted into air A2 having a higher temperature. The air A2 is then passed through a heat exchanger 32 so as to be subjected to a heat exchange process with the later-described low-temperature, high-humidity, and water-droplets-free air A5, and is thereby converted into low-temperature, high-humidity, and water-droplets-containing air A3. The air A3 is then expanded by an expansion turbine 33, and is thereby converted into low-temperature, high-humidity air A4 having a lower temperature and a higher water-droplets content. This air A4 is separated by the vortex-stream gas-liquid separator 9 into gas and liquid. The separated liquid is discharged (B1), and the gas, now low-temperature, high-humidity, and water-droplets-free air A5, is passed through a heat exchanger 32 so as to be subjected to a heat exchange process with the high-temperature air A2 that has passed through the compressor 31, and is thereby converted into high-temperature, low-humidity air A6.

When this gas-liquid separation system 30 is used in a clothes dryer, the high-temperature, low-humidity air A6 is fed to the clothes-drying drum, and the high-temperature, high-humidity air A1 discharged from the drum is fed to the gas-liquid separation system 30. Comparison between a clothes dryer provided with a gas-liquid separation system 30 embodying the present invention and a conventional clothes dryer that employs a condenser to achieve gas-liquid separation made it clear that the one provided with the gas-liquid separation system 30 offers higher gas-liquid separation performance, requiring about one-third of the drying time typically required conventionally and thus greatly reducing the running costs.

Obviously, many modifications and variations of the present invention are possible in light of the above teachings. It is therefore to be understood that within the scope of the appended claims, the invention may be practiced other than as specifically described. It is to be understood that the liquid and gas intended as the targets of separation here are not limited to water and air, but may be any liquid and gas, such as liquid and gas of organic compounds.

INDUSTRIAL APPLICABILITY

A vortex-stream gas-liquid separator and a gas-liquid separation system according to the present invention can be used suitably in various apparatuses, such as clothes dryers and air conditioners, that separate liquid from gas containing liquid suspended therein.

What is claimed is:

1. A vortex-stream gas-liquid separator for separating gas and liquid contained in gas-liquid two-phase fluid, comprising:
a fluid passage having substantially a shape of a column and arranged with a center axis thereof lying substantially horizontally, a fluid inlet provided near a first end surface of the fluid passage so as to introduce the gas-liquid two-phase fluid into the fluid passage in such a way that the gas-liquid two-phase fluid passes through the fluid passage in a form of a vortex stream, a gas outlet provided at a second end surface of the fluid passage substantially coaxially with the fluid passage so as to discharge separated gas, and a liquid outlet provided in a lower portion of the fluid passage between a center and the second end surface of the fluid passage so as to discharge separated liquid.

2. A vortex-stream gas-liquid separator as claimed in claim 1, further comprising a liquid collection reservoir provided below the fluid passage and communicating with the fluid passage through the liquid outlet so as to collect the liquid discharged through the liquid outlet.

3. A vortex-stream gas-liquid separator as claimed in claim 2, wherein the shape and size of the liquid collection reservoir is such that, based on a predetermined amount of the liquid collected therein, a surface of the collected liquid is 10 mm or more away from the liquid outlet.

4. A vortex-stream gas-liquid separator as claimed in claim 2, further comprising a drain outlet provided in a lower portion of the liquid collection reservoir, a float provided inside the liquid collection reservoir so as to float on the liquid collected in the liquid collection reservoir, and a valve coupled to the float so as to open/close the drain outlet by moving together with the float.

5. A vortex-stream gas-liquid separator as claimed in claim 4, wherein the float and the valve are so designed as to keep a surface of the collected liquid 10 mm or more away from the liquid outlet at all times.

6. A vortex-stream gas-liquid separator as claimed in claim 1, wherein the fluid inlet introduces the gas-liquid two-phase fluid in such a way that the gas-liquid two-phase fluid flows into only one of two portions of the fluid passage divided by a plane including the center axis of the fluid passage and substantially parallel to that plane.

7. A vortex-stream gas-liquid separator as claimed in claim 1, wherein the liquid outlet reaches the second end surface of the fluid passage.

8. A vortex-stream gas-liquid separator as claimed in claim 1, further comprising a damming means provided near the liquid outlet so as to prevent liquid that has condensed on an inner circumferential surface of the fluid passage from traveling toward the second end surface of the fluid passage.

9. A vortex-stream gas-liquid separator as claimed in claim 1, further comprising a restricting means provided on the second end surface of the fluid passage so as to prevent liquid from flowing along the second end surface to the gas outlet.

10. A vortex-stream gas-liquid separator as claimed in claim 9, wherein the restricting means is realized as a pipe that at one end communicates with the gas outlet and that at the other end protrudes inward from the second end surface of the fluid passage so as to have an opening inside the fluid passage.

11. A vortex-stream gas-liquid separator as claimed in claim 10, further comprising a partition plate provided so as to extend from an end of the pipe radially outward inside the fluid passage, with at least two thirds of the liquid outlet located between the partition plate and the second end surface of the fluid passage.

12. A vortex-stream gas-liquid separator as claimed in claim 1, wherein the liquid outlet measure between 8 mm and 30 mm, inclusive, along the center axis of the fluid passage.

13. A vortex-stream gas-liquid separator as claimed in claim 1, wherein, as the liquid outlet, a plurality of openings are provided within an area measuring between 8 mm and 30 mm, inclusive, along the center of the fluid passage.

14. A vortex-stream gas-liquid separator as claimed in claim 1, wherein a member that defines an inner circumferential surface of the fluid passage has a resilient wall surface.

15. A vortex-stream gas-liquid separator for separating gas and liquid contained in a gas-liquid two-phase fluid, comprising:

a fluid passage having substantially a shape of a column and arranged with a center axis thereof lying substantially horizontally, a fluid inlet provided near a first end surface of the fluid passage so as to introduce the gas-liquid two-phase fluid into the fluid passage in such a way that the gas-liquid two-phase fluid passes through the fluid passage in a form of a vortex stream, a gas outlet provided at a second end surface of the fluid passage substantially coaxially with the fluid passage so as to discharge separated gas, a liquid outlet provided in a lower portion of the fluid passage about 180 degrees or more around the fluid passage from the fluid inlet in a direction of the vortex stream of the gas-liquid two-phase fluid and having a strip-like shape extending along the center axis of the fluid passage, and a liquid collection reservoir provided below the fluid passage and communication with the fluid passage through the liquid outlet so as to collect the liquid discharged through the liquid outlet.

16. A gas-liquid separation system comprising a vortex-stream gas-liquid separator as claimed in claim 1, a compressor for compressing air, a heat exchanger for exchanging heat between air fed from the compressor and air fed from the gas outlet of the vortex-stream gas-liquid separator, and an expander for expanding the air fed from the compressor through the heat exchanger and then feeding the thus expanded air to the fluid inlet of the vortex-stream gas-liquid separator, wherein air in a first, high-humidity, state is converted into air in a second, high-temperature and high-humidity, state by the compressor, then the air in the second state is converted into air in a third, low-temperature and high-humidity, state by the heat exchanger, then the air in the third state is converted into air in a fourth, low-temperature, high-humidity, and water-droplets-containing, state by the expander, then the air in the fourth state is separated into water and air in a fifth, low-temperature, high-humidity, and water-droplets-free, state by the vortex-stream gas-liquid separator, and then the air in the fifth state is converted into air in a sixth, high-temperature and low-humidity, state by the heat exchanger.

* * * * *